US012398297B2

(12) United States Patent
Toyota

(10) Patent No.: US 12,398,297 B2
(45) Date of Patent: Aug. 26, 2025

(54) POLARIZING FILM LAMINATE

(71) Applicant: NITTO DENKO CORPORATION, Ibaraki (JP)

(72) Inventor: Yuji Toyota, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 89 days.

(21) Appl. No.: 18/016,467

(22) PCT Filed: Jul. 19, 2021

(86) PCT No.: PCT/JP2021/026931
§ 371 (c)(1),
(2) Date: Jan. 17, 2023

(87) PCT Pub. No.: WO2022/019258
PCT Pub. Date: Jan. 27, 2022

(65) Prior Publication Data
US 2023/0287247 A1 Sep. 14, 2023

(30) Foreign Application Priority Data

Jul. 22, 2020 (JP) .................. 2020-125652

(51) Int. Cl.
*C09J 7/38* (2018.01)
*G02B 5/30* (2006.01)
(52) U.S. Cl.
CPC .............. *C09J 7/38* (2018.01); *G02B 5/3025* (2013.01); *C09J 2301/12* (2020.08); *C09J 2301/302* (2020.08); *C09J 2301/312* (2020.08)

(58) Field of Classification Search
CPC ......................................... C09J 7/38
See application file for complete search history.

(56) References Cited

U.S. PATENT DOCUMENTS

| | | | |
|---|---|---|---|
| 7,126,754 | B2 | 10/2006 | Yamaoka et al. |
| 8,148,442 | B2 | 4/2012 | Nagamoto et al. |
| 2005/0117217 | A1 | 6/2005 | Yamaoka et al. |
| 2006/0162857 | A1 | 7/2006 | Nagamoto et al. |
| 2018/0011233 | A1 | 1/2018 | Takada et al. |

(Continued)

FOREIGN PATENT DOCUMENTS

| | | |
|---|---|---|
| EP | 2055755 A1 | 5/2009 |
| EP | 4187290 A1 | 5/2023 |

(Continued)

OTHER PUBLICATIONS

Machine translation JP2007314618A (Year: 2007).*

(Continued)

*Primary Examiner* — Abbas Rashid
*Assistant Examiner* — Wayne K. Swier
(74) *Attorney, Agent, or Firm* — WHDA, LLP

(57) ABSTRACT

The present invention provides a polarizing film laminate having reworkability. The polarizing film laminate of the present invention has a configuration in which a polarizing plate including a polarizer, a first pressure-sensitive adhesive layer, a supporting substrate, and a second pressure-sensitive adhesive layer having a smaller pressure-sensitive adhesive strength to glass than the first pressure-sensitive adhesive layer are laminated in the stated order.

9 Claims, 4 Drawing Sheets

(56) References Cited

U.S. PATENT DOCUMENTS

| | | | |
|---|---|---|---|
| 2018/0134921 A1* | 5/2018 | Nakamura | B05D 5/10 |
| 2019/0008127 A1 | 1/2019 | Gravelle et al. | |
| 2019/0081274 A1 | 3/2019 | Choi et al. | |
| 2019/0103589 A1 | 4/2019 | Iida et al. | |
| 2019/0339421 A1 | 11/2019 | Byun et al. | |
| 2020/0032114 A1 | 1/2020 | Kimura et al. | |
| 2023/0128331 A1 | 4/2023 | Takemoto et al. | |
| 2023/0131221 A1 | 4/2023 | Toyota | |
| 2023/0287247 A1 | 9/2023 | Toyota | |

FOREIGN PATENT DOCUMENTS

| | | |
|---|---|---|
| JP | 2004-078171 A | 3/2004 |
| JP | 2007-314618 A | 12/2007 |
| JP | 2008-299316 A | 12/2008 |
| JP | 2013-003515 A | 1/2013 |
| JP | 2016-094592 A | 5/2016 |
| JP | 2016-167040 A | 9/2016 |
| JP | 2018-031919 A | 3/2018 |
| JP | 2019-045834 A | 3/2019 |
| KR | 10-2006-0086853 A | 8/2006 |
| WO | 2003/107049 A1 | 12/2003 |
| WO | 2014/069542 A1 | 5/2014 |
| WO | WO-2017169895 A1 * | 10/2017 ............ B32B 27/00 |
| WO | 2019/203121 A1 | 10/2019 |
| WO | 2021/200722 A1 | 10/2021 |
| WO | 2021/200723 A1 | 10/2021 |
| WO | 2022/019258 A1 | 1/2022 |

OTHER PUBLICATIONS

Machine translation JPWO2017169895A1 (Year: 2018).*
Extended (Supplementary) Search Report dated Jun. 16, 2023, issued in counterpart EP Application No. 23152625.2. (10 pages).
Office Action dated Apr. 2, 2024, issued in counterpart JP Application No. 2023-004728, with English translation. (8 pages).
Catalogue of Office Furniture, Kurogane, vol. 45, pp. 110-111, 2020-2021; w/ English Translation; Cited in the Specification. (6 pages).
English translation of International Search Report dated Oct. 12, 2021, issued in counterpart international application No. PCT/JP2021/026931. (3 pages).
Office Action dated Dec. 5, 2023, issued in counterpart JP Application No. 2023-004728, with English translation. (9 pages).
Non-Final Office Action dated Jun. 18, 2025, issued in U.S. Appl. No. 18/098,219. (45 pages).

* cited by examiner

POLARIZING FILM LAMINATE

TECHNICAL FIELD

The present invention relates to a polarizing film laminate.

BACKGROUND ART

In recent years, for the purpose of achieving a bright and open working space or living space, there has been performed design involving, for example, increasing a ratio of a window in a wall or door for dividing the space or making a whole surface of the wall or the door a window.

However, a case in which an image display apparatus, such as a personal computer, a television, or a monitor, is placed in such space as described above is not preferred in terms of information security and privacy because its displayed content may be observed from the outside.

In view of the foregoing, there is a proposal of a technology involving bonding a polarizing plate with a pressure-sensitive adhesive layer to a window so that an absorption axis direction thereof is parallel to a vibration direction of linearly polarized light to be emitted from a display screen of the image display apparatus, to thereby prevent its displayed content from being observed from the outside (for example, Non Patent Literature 1).

CITATION LIST

Non Patent Literature

[NPL 1] Kurogane Kosakusho Ltd., General Catalog [2020 edition, Vol. 45, page 110]

SUMMARY OF INVENTION

Technical Problem

However, a pressure-sensitive adhesive to be used for the related-art polarizing plate with a pressure-sensitive adhesive layer is designed to be used for an image display apparatus, and hence the polarizing plate is difficult to peel off once bonded. Accordingly, there is a problem in that the polarizing plate needs to be disposed of together with a windowpane when removed.

The present invention has been made in order to solve the above-mentioned problem, and a primary object of the present invention is to provide a polarizing film laminate improved in peelability and reworkable.

Solution to Problem

According to one aspect of the present invention, there is provided a polarizing film laminate, including: a polarizing plate including a polarizer; a first pressure-sensitive adhesive layer; a supporting substrate; and a second pressure-sensitive adhesive layer having a smaller pressure-sensitive adhesive strength to glass than the first pressure-sensitive adhesive layer, which are laminated in the stated order.

In one embodiment, the polarizing plate further includes a protective layer arranged on at least one side of the polarizer.

In one embodiment, the supporting substrate includes a substrate main body and a functional layer arranged on at least one side thereof.

In one embodiment, the functional layer is at least one kind of layer selected from an antistatic layer and an antifouling layer.

In one embodiment, a thickness from the polarizing plate to the second pressure-sensitive adhesive layer is from 50 µm to 500 µm.

In one embodiment, the polarizing film laminate further includes a release film laminated on an opposite side of the second pressure-sensitive adhesive layer to a side on which the supporting substrate is arranged.

According to another aspect of the present invention, there is provided a transparent barrier configured to divide a space having placed therein an image display apparatus configured to emit linearly polarized light from a display screen, the barrier having bonded thereto the polarizing film laminate via the second pressure-sensitive adhesive layer so that an absorption axis of the polarizer is substantially parallel to a vibration direction of the linearly polarized light to be emitted by the image display apparatus.

In one embodiment, the barrier is a window, a wall, a door, or a partition.

Advantageous Effects of Invention

According to the present invention, the configuration in which the polarizing plate including the polarizer, the first pressure-sensitive adhesive layer, the supporting substrate, and the second pressure-sensitive adhesive layer having a smaller pressure-sensitive adhesive strength to glass than the first pressure-sensitive adhesive layer are laminated in the stated order is adopted, and a pressure-sensitive adhesive layer having a smaller pressure-sensitive adhesive strength to glass than the first pressure-sensitive adhesive layer is adopted as the second pressure-sensitive adhesive layer. Thus, when the resultant polarizing film laminate is bonded to a windowpane or the like via the second pressure-sensitive adhesive layer, the first pressure-sensitive adhesive layer exhibits a sufficient pressure-sensitive adhesive strength to both of the polarizing plate and the supporting substrate to prevent the polarizing plate from coming off, and besides, the polarizing film laminate can be easily peeled off because the second pressure-sensitive adhesive layer is designed to be peeled off more lightly than the first pressure-sensitive adhesive layer. In addition, the polarizing film laminate can be bonded again after being peeled off, and hence can be reworked. As a result, the polarizing film laminate can be bonded only to a required portion in accordance with where an image display apparatus is placed.

DESCRIPTION OF EMBODIMENTS

Preferred embodiments of the present invention are described below. However, the present invention is not limited to these embodiments.

A. Polarizing Film Laminate

A polarizing film laminate according to one embodiment of the present invention has a configuration in which a polarizing plate including a polarizer, a first pressure-sensitive adhesive layer, a supporting substrate, and a second pressure-sensitive adhesive layer having a smaller pressure-sensitive adhesive strength to glass than the first pressure-sensitive adhesive layer are laminated in the stated order.

A-1. Overall Configuration of Polarizing Film Laminate

Figure 1A:
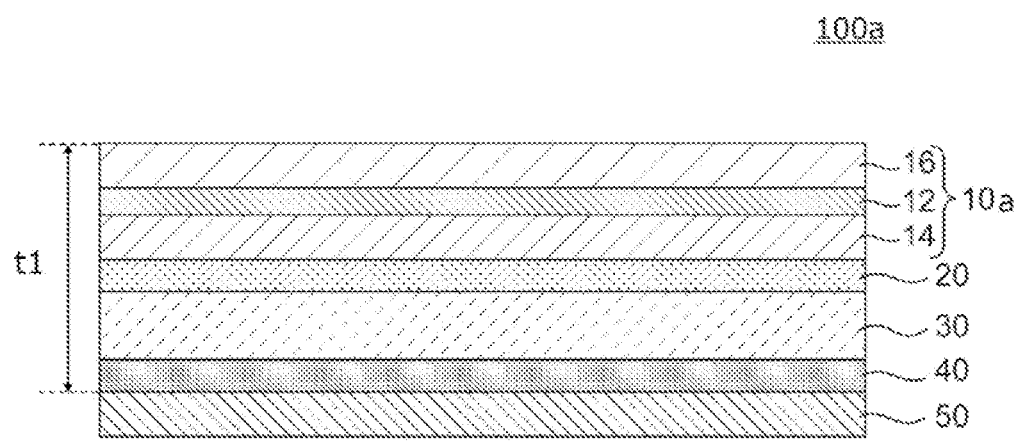
FIG. 1A is a schematic sectional view of a polarizing film laminate according to one embodiment of the present invention.

FIG. 1A is a schematic sectional view of a polarizing film laminate according to one embodiment of the present invention. A polarizing film laminate 100a has a configuration in which a polarizing plate 10a, a first pressure-sensitive adhesive layer 20, a supporting substrate 30, and a second pressure-sensitive adhesive layer 40 are laminated in the stated order, and can be bonded to a transparent member such as a windowpane via the second pressure-sensitive adhesive layer 40. Further, in the polarizing film laminate 100a, a release film 50 is laminated on (temporarily bonded to) the surface of the second pressure-sensitive adhesive layer 40 on the opposite side to the side on which the supporting substrate 30 is arranged. The release film 50 protects the second pressure-sensitive adhesive layer 40 by being temporarily bonded until the polarizing film laminate 100a is used.

Figure 1B:
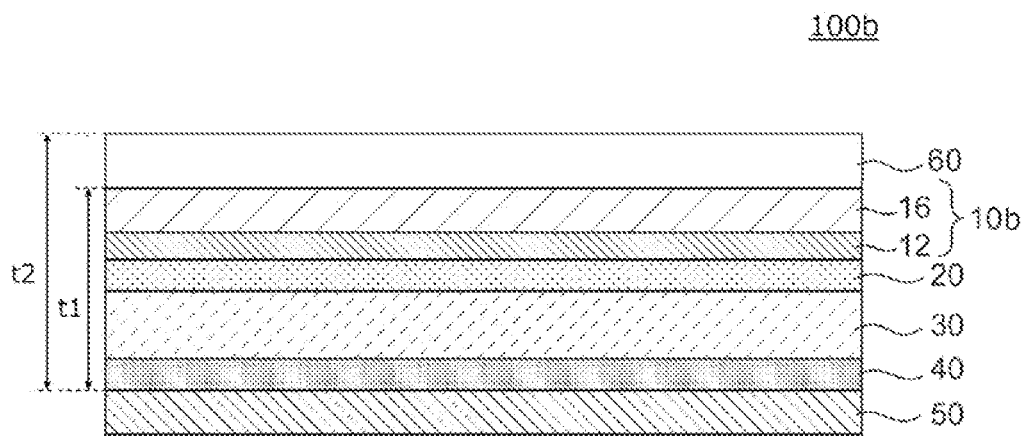
FIG. 1B is a schematic sectional view of a polarizing film laminate according to another embodiment of the present invention.

FIG. 1B is a schematic sectional view of a polarizing film laminate according to another embodiment of the present invention. A polarizing film laminate 100b has a configuration in which a protective substrate 60, a polarizing plate 10b, the first pressure-sensitive adhesive layer 20, the supporting substrate 30, and the second pressure-sensitive adhesive layer 40 are laminated in the stated order, and can be bonded to a transparent member such as a windowpane via the second pressure-sensitive adhesive layer 40. Further, the release film 50 is laminated on (temporarily bonded to) the surface of the second pressure-sensitive adhesive layer 40 on the opposite side to the side on which the supporting substrate 30 is arranged. The arrangement of the protective substrate 60 on the back surface side of the polarizing plate (opposite side to the side on which the first pressure-sensitive adhesive layer is arranged) can impart scratch-resisting performance, scattering-preventing performance, non-combustible performance, and the like to the polarizing film laminate. The protective substrate 60 is bonded to the polarizing plate 10b via any appropriate adhesion layer (adhesive layer or pressure-sensitive adhesive layer).

A total thickness (t1) from the polarizing plate to the second pressure-sensitive adhesive layer of the polarizing film laminate is preferably from 50 μm to 500 μm, more preferably from 100 μm to 250 μm. With such thickness, workability is satisfactory in bonding, peeling, and the like. In addition, when the polarizing film laminate includes the protective substrate, a total thickness (t2) from the protective substrate to the second pressure-sensitive adhesive layer of the polarizing film laminate is preferably from 50 μm to 2.5 mm, more preferably from 100 μm to 2.0 mm. With such thickness, there can be obtained a polarizing film laminate having scratch-resisting performance, scattering-preventing performance, non-combustible performance, and the like without the impairment of the workability.

The single layer transmittance of the polarizing film laminate (in a state in which the release film has been peeled off) is preferably 30% or more, more preferably from 35% to 45%, and is preferably from 35% to 43% in terms of practicality. When the single layer transmittance falls within such ranges, a more open space can be achieved.

The constituent elements of the polarizing film laminate are described in more detail below.

A-2. Polarizing Plate

The polarizing plate includes a polarizer. The polarizing plate may further include a protective layer arranged on one side, or each of both sides, of the polarizer as required. For example, the polarizing plate 10a illustrated in FIG. 1A includes a polarizer 12, an inner protective layer 14 arranged on the first pressure-sensitive adhesive layer 20 side of the polarizer 12, and an outer protective layer 16 arranged on the opposite side of the polarizer 12 to the side on which the first pressure-sensitive adhesive layer 20 is arranged. Meanwhile, the polarizing plate 10b illustrated in FIG. 1B has a configuration including the polarizer 12 and the outer protective layer 16 arranged on the opposite side of the polarizer 12 to the side on which the first pressure-sensitive adhesive layer 20 is arranged, with the omission of the inner protective layer. The polarizing plate may have a configuration (not shown) including the polarizer and the inner protective layer, with the omission of the outer protective layer.

A-2-1. Polarizer

The polarizer 12 is typically formed from a polyvinyl alcohol-based resin film containing a dichroic substance (e.g., iodine). The polarizer may be formed from a single-layer resin film, or may be produced by using a laminate of two or more layers.

Specific examples of the polarizer formed from a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

A specific example of the polarizer obtained by using a laminate is a polarizer obtained by using a laminate of a resin substrate and a PVA-based resin layer (PVA-based resin film) laminated on the resin substrate or a laminate of a resin substrate and a PVA-based resin layer formed on the resin substrate through application. The polarizer obtained by using the laminate of the resin substrate and the PVA-based resin layer formed on the resin substrate through application may be produced, for example, by: applying a PVA-based resin solution to the resin substrate; drying the solution to form the PVA-based resin layer on the resin substrate, to thereby provide the laminate of the resin substrate and the PVA-based resin layer; and stretching and dyeing the laminate to turn the PVA-based resin layer into the polarizer. In this embodiment, the stretching typically includes stretching of the laminate under a state in which the laminate is immersed in an aqueous solution of boric acid. Further, the stretching may further include in-air stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeling surface. Details about such method of producing the polarizer are described in, for example, JP 2012-73580 A, the description of which is incorporated herein by reference in its entirety.

The thickness of the polarizer is, for example, 30 µm or less, preferably 15 µm or less, more preferably from 1 µm to 12 µm, still more preferably from 2 µm to 10 µm, particularly preferably from 2 µm to 8 µm.

The polarizer preferably shows absorption dichroism at any wavelength in the wavelength range of from 380 nm to 780 nm. The single layer transmittance of the polarizer is preferably from 38.6% to 46.0%, more preferably from 40.0% to 43.0% or from 43.0% to 46.0%. The polarization degree of the polarizer is preferably 97.0% or more, more preferably 99.0% or more, still more preferably 99.9% or more.

A-2-2. Protective Layers

The inner protective layer 14 and the outer protective layer 16 may each be formed of any appropriate film as long as the film can function as a protective layer for a polarizer. As a material serving as a main component of the film, there are specifically given, for example, cellulose-based resins, such as triacetylcellulose (TAC), and transparent resins, such as polyester-based, polyvinyl alcohol-based, polycarbonate-based, polyamide-based, polyimide-based, polyether sulfone-based, polysulfone-based, polystyrene-based, polynorbornene-based, polyolefin-based, (meth)acrylic, and acetate-based resins. There are also given, for example, thermosetting resins or UV-curable resins, such as (meth) acrylic, urethane-based, (meth)acrylic urethane-based, epoxy-based, and silicone-based resins. There are also given, for example, glassy polymers such as a siloxane-based polymer. In addition, a polymer film described in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as a material for the film, and the composition is, for example, a resin composition containing an alternating copolymer formed of isobutene and N-methylmaleimide, and an acrylonitrile-styrene copolymer. The polymer film may be, for example, an extrudate of the resin composition.

It is preferred that at least one of the inner protective layer or the outer protective layer be optically isotropic. Specifically, when the polarizing film laminate is bonded to the outer surface of a barrier for dividing a space having placed therein an image display apparatus (outside of the space), it is preferred that the inner protective layer be optically isotropic. In addition, when the polarizing film laminate is bonded to the inner surface of a barrier for dividing a space having placed therein an image display apparatus (inside of the space), it is preferred that the outer protective layer be optically isotropic. The phrase "optically isotropic" as used herein refers to having an in-plane retardation Re(550) of from 0 nm to 10 nm and a thickness direction retardation Rth(550) of from −10 nm to +10 nm. The "Re(550)" is an in-plane retardation measured at 23° C. with light having a wavelength of 550 nm, and is determined by the equation: Re=(nx−ny)×d. In addition, the "Rth(550)" is a thickness direction retardation measured at 23° C. with light having a wavelength of 550 nm, and is determined by the equation: Rth=(nx−nz)×d. In the equations, "nx" represents a refractive index in a direction in which an in-plane refractive index becomes maximum (i.e., a slow axis direction), "ny" represents a refractive index in a direction perpendicular to the slow axis in a plane (i.e., a fast axis direction), "nz" represents a thickness direction refractive index, and "d" represents the thickness (nm) of the layer (film).

A hard coat layer may be arranged as required on the outer surface of the outer protective layer (i.e., the surface thereof on the opposite side to the polarizer side). Specific examples of a material for forming the hard coat layer include a thermosetting resin, a thermoplastic resin, an active energy ray-curable resin (e.g., a UV-curable resin or an electron beam-curable resin), and a two-component resin. Of those, a UV-curable resin is preferred. This is because the hard coat layer can be efficiently formed by an easy processing operation.

The thickness of the hard coat layer is preferably from 1 µm to 20 µm, more preferably from 2 µm to 15 µm.

The thickness of the inner protective layer and the thickness of the outer protective layer (when the hard coat layer is arranged, a total thickness including the thickness of the hard coat layer) are each preferably from 10 µm to 250 µm, more preferably from 20 µm to 150 µm, still more preferably from 25 µm to 100 µm, even still more preferably from 25 µm to 50 µm.

A-3. Supporting Substrate

Figure 2A:
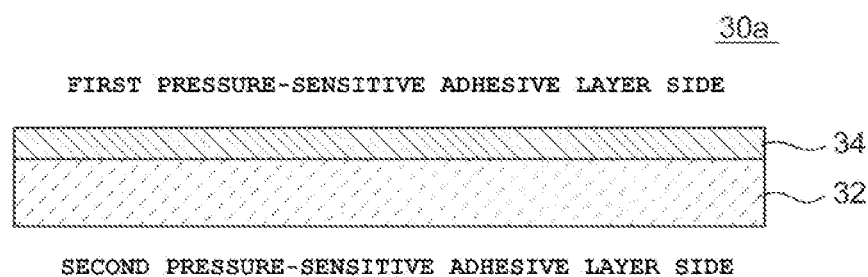
FIG. 2A is a schematic sectional view of an example of a supporting substrate that may be used in the present invention.
Figure 2B:
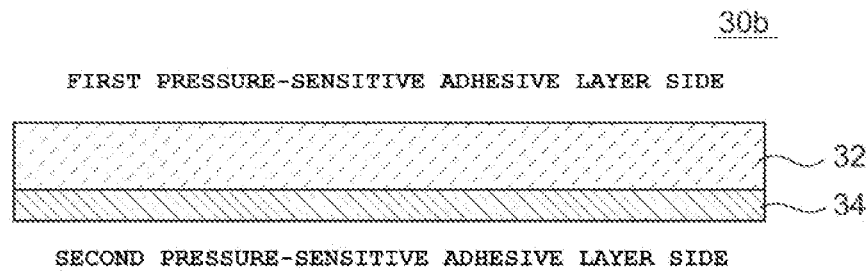
FIG. 2B is a schematic sectional view of an example of the supporting substrate that may be used in the present invention.
Figure 2C:
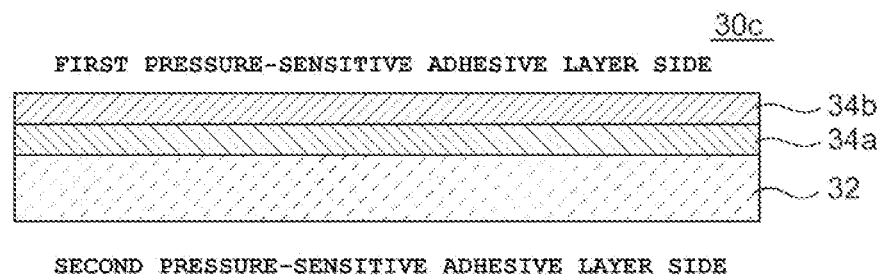
FIG. 2C is a schematic sectional view of an example of the supporting substrate that may be used in the present invention.

The supporting substrate 30 includes a substrate main body formed of a resin film. The supporting substrate may be formed only of the substrate main body, but may further include a functional layer on one side, or each of both sides, of the substrate main body as required. For example, FIG. 2A to FIG. 2C are each a schematic sectional view of an example of the supporting substrate that may be used in the present invention. A supporting substrate 30a illustrated in FIG. 2A includes a substrate main body 32 and a functional layer 34 arranged on the first pressure-sensitive adhesive layer side of the substrate main body 32. A supporting substrate 30*b* illustrated in FIG. 2B includes the substrate main body 32 and the functional layer 34 arranged on the second pressure-sensitive adhesive layer side of the substrate main body 32. A supporting substrate 30*c* illustrated in FIG. 2C includes the substrate main body 32, and a functional layer 34*a* and a functional layer 34*b* which are arranged in the stated order on the first pressure-sensitive adhesive layer side of the substrate main body 32.

The supporting substrate satisfactorily supports the polarizing plate when the polarizing film laminate is bonded to an adherend and when the polarizing film laminate is temporarily peeled from the adherend for reworking. Specifically, the polarizing plate may expand or contract depending on the temperature and/or humidity of a surrounding environment to undergo a dimensional change, and hence when the polarizing plate is bonded to the adherend via the second pressure-sensitive adhesive layer without the arrangement of the supporting substrate, the second pressure-sensitive adhesive layer, which is designed to be lightly peeled off, alone cannot sufficiently support the polarizing plate, resulting in floating and peeling of the polarizing plate in some cases. In contrast, when the supporting substrate is arranged via the first pressure-sensitive adhesive layer, the floating and peeling can be prevented. In addition, the polarizing plate is relatively liable to be torn, and hence requires careful peeling work when reworked, and moreover, may be torn even when the peeling work is carefully performed. In this regard, when the supporting substrate is arranged via the first pressure-sensitive adhesive layer, and the resultant is bonded to the adherend via the second pressure-sensitive adhesive layer, the tearing can be prevented, and at the same time, the peeling work can be simply performed. Such effect of the supporting substrate can be particularly suitably obtained when a polarizing plate having no inner protective layer is used.

The water absorption ratio of the supporting substrate is preferably 1.5% or less, more preferably 1.0% or less. When the water absorption ratio falls within the ranges, the above-mentioned effect can be suitably obtained. The water absorption ratio may be determined in conformity with ASTM D570 (24 h-3.18 mm thickness).

A-3-1. Substrate Main Body

Any appropriate resin film may be used as the substrate main body as long as the polarizing plate can be supported. Examples of the resin film for forming the substrate main body include a polyester-based resin film, a cycloolefin-based resin film, an acrylic resin film, a cellulose ester-based resin film, a cellulose-based resin film, a polyester carbonate-based resin film, an olefin-based resin film, a polyurethane-based resin film, a polycarbonate-based resin film, and a polyvinyl acetal-based resin film. Of those, a polyester-based resin film such as polyethylene terephthalate is preferred. Those resins may be used alone, or may be used in combination thereof depending on desired characteristics.

The thickness of the substrate main body is preferably from 5 µm to 250 µm, more preferably from 10 µm to 150 µm, still more preferably from 20 µm to 100 µm.

The substrate main body may be subjected to surface treatment such as corona treatment or the application of a silane coupling agent or the like as required.

A-3-2. Functional Layer

Examples of the functional layer include an antistatic layer, an antifouling layer, a printed layer, and an easy-adhesion layer. The functional layers may be arranged alone or in combination thereof. For example, the functional layer 34 illustrated in FIG. 2A may be preferably an antistatic layer, an antifouling layer, or a printed layer, more preferably an antistatic layer. In addition, for example, the functional layer 34 illustrated in FIG. 2B may be preferably an antistatic layer. In addition, for example, the functional layer 34*a* illustrated in FIG. 2C is preferably an antistatic layer or a printed layer, and the functional layer 34*b* is preferably an antifouling layer.

The antistatic layer typically contains a conductive material and a binder resin. Any appropriate conductive material may be used as the conductive material. A conductive polymer is preferably used. Examples of the conductive polymer include a polythiophene-based polymer, a polyacetylene-based polymer, a polydiacetylene-based polymer, a polyyne-based polymer, a polyphenylene-based polymer, a polynaphthalene-based polymer, a polyfluorene-based polymer, a polyanthracene-based polymer, a polypyrene-based polymer, a polyazulene-based polymer, a polypyrrole-based polymer, a polyfuran-based polymer, a polyselenophene-based polymer, a polyisothianaphthene-based polymer, a polyoxadiazole-based polymer, a polyaniline-based polymer, a polythiazyl-based polymer, a polyphenylene vinylene-based polymer, a polythienylene vinylene-based polymer, a polyacene-based polymer, a polyphenanthrene-based polymer, and a polyperinaphthalene-based polymer. Those polymers are used alone or in combination thereof. A polyurethane-based resin is preferably used as the binder resin. When the polyurethane-based resin is used, an antistatic layer having both of flexibility and excellent adhesiveness can be arranged.

The antifouling layer preferably contains a fluorine-containing compound. Of the fluorine-containing compounds, a fluorine-based polymer containing a perfluoropolyether skeleton is preferred because of being excellent in water repellency and capable of exhibiting a high antifouling property. From the viewpoint of enhancing the antifouling property, perfluoropolyether having such a main chain structure as to be capable of forming a rigid row is particularly preferred. A structural unit of the main chain skeleton of the perfluoropolyether is preferably a perfluoroalkylene oxide having 1 to 4 carbon atoms that may be branched, and examples thereof include perfluoromethylene oxide ($-CF_2O-$), perfluoroethylene oxide ($-CF_2CF_2O-$), perfluoropropylene oxide ($-CF_2CF_2CF_2O-$), and perfluoroisopropylene oxide ($-CF(CF_3)CF_2O-$).

The printed layer may be a design layer provided with a predetermined design, or may be a solid-colored layer. The printed layer may be formed by applying any appropriate ink or paint. The ink or paint to be used typically contains a binder, a colorant, a solvent, and any appropriate additive that may be used as required. Examples of the binder include a chlorinated polyolefin (e.g., chlorinated polyethylene or chlorinated polypropylene), a polyester-based resin, a urethane-based resin, an acrylic resin, a vinyl acetate resin, a vinyl chloride-vinyl acetate copolymer, and a cellulose-based resin. The binder resins may be used alone or in combination thereof. Any appropriate colorant may be used as the colorant depending on purposes. Specific examples of the colorant include: inorganic pigments, such as titanium white, zinc oxide, carbon black, iron black, red iron oxide, chrome vermilion, ultramarine blue, cobalt blue, yellow lead, and titanium yellow; organic pigments or dyes, such as phthalocyanine blue, indanthrene blue, isoindolinone yellow, benzidine yellow, quinacridone red, polyazo red, perylene red, and aniline black; metal pigments each formed of scale-like foil pieces of aluminum, brass, or the like; and pearlescent pigments (pearl pigments) each formed of scale-like foil pieces of titanium dioxide-coated mica, basic lead carbonate, or the like.

The thickness of the functional layer may be appropriately set depending on, for example, purposes and applications. The thickness of each functional layer is, for example, from 0.1 μm to 2 μm, preferably from 0.1 μm to 1.5 μm.

A-4. First Pressure-Sensitive Adhesive Layer

The first pressure-sensitive adhesive layer 20 has a pressure-sensitive adhesive strength to glass of preferably from 1.0 N/25 mm to 20 N/25 mm, more preferably from 2.0 N/25 mm to 15 N/25 mm, still more preferably from 3 N/25 mm to 10 N/25 mm. When the pressure-sensitive adhesive strength to glass falls within the above-mentioned ranges, a sufficient pressure-sensitive adhesive strength can be exhibited to both of the polarizing plate and the supporting substrate. Herein, the pressure-sensitive adhesive strength to glass is a value measured in conformity with JIS 20237.

The first pressure-sensitive adhesive layer is formed by applying a pressure-sensitive adhesive composition to any of various substrates and performing drying, radiation irradiation, and the like as required. When the first pressure-sensitive adhesive layer is formed on a release film, the pressure-sensitive adhesive layer may be used by being transferred from the release film onto a desired member (specifically, the supporting substrate or the polarizing plate). Alternatively, the first pressure-sensitive adhesive layer may be directly formed on the supporting substrate 30.

The thickness of the first pressure-sensitive adhesive layer is, for example, from 2 μm to 50 μm, preferably from 5 μm to 35 μm, more preferably from 10 μm to 25 μm.

Any appropriate pressure-sensitive adhesive composition may be used as the pressure-sensitive adhesive composition for forming the first pressure-sensitive adhesive layer. Examples thereof include rubber-based, acrylic, silicone-based, urethane-based, vinyl alkyl ether-based, polyvinyl alcohol-based, polyvinylpyrrolidone-based, polyacrylamide-based, and cellulose-based pressure-sensitive adhesive compositions. Of those, an acrylic pressure-sensitive adhesive composition is preferably used because of being excellent in optical transparency, and also excellent in pressure-sensitive adhesive characteristics, weatherability, heat resistance, and the like.

The acrylic pressure-sensitive adhesive composition contains, as a base polymer, a partial polymerization product of monomer components containing an alkyl (meth)acrylate and/or an acrylic polymer obtained from the monomer components. Specifically, the content ratio of the acrylic polymer in the acrylic pressure-sensitive adhesive composition is preferably from 50 wt % to 100 wt %, more preferably from 60 wt % to 100 wt %, still more preferably from 70 wt % to 100 wt %, particularly preferably from 80 wt % to 100 wt %, most preferably from 90 wt % to 100 wt % in terms of solid content.

Examples of the alkyl (meth)acrylate may include alkyl (meth)acrylates each having, at its ester end, a linear or branched alkyl group having 1 to 24 carbon atoms. The alkyl (meth)acrylates may be used alone or in combination thereof. Herein, the "(meth)acrylate" means acrylate and/or methacrylate.

An example of the alkyl (meth)acrylate may be a branched alkyl (meth)acrylate having 4 to 9 carbon atoms. Such alkyl (meth)acrylate is preferred because a balance between pressure-sensitive adhesive characteristics is easily achieved. Specific examples thereof include n-butyl (meth)acrylate, s-butyl (meth)acrylate, t-butyl (meth)acrylate, isobutyl (meth)acrylate, n-pentyl (meth)acrylate, isopentyl (meth)acrylate, isohexyl (meth)acrylate, isoheptyl (meth) acrylate, 2-ethylhexyl (meth)acrylate, isooctyl (meth)acrylate, and isononyl (meth)acrylate. Those alkyl (meth)acrylates may be used alone or in combination thereof.

The alkyl (meth)acrylate having, at its ester end, an alkyl group having 1 to 24 carbon atoms accounts for preferably 40 wt % or more, more preferably 50 wt % or more, still more preferably 60 wt % or more with respect to the total amount of monofunctional monomer components for forming the (meth)acrylic polymer.

The monomer components may contain, as a monofunctional monomer component, a copolymerizable monomer other than the alkyl (meth)acrylate (e.g., a carboxyl group-containing monomer, a hydroxyl group-containing monomer, an amide group-containing monomer, or an aromatic ring-containing (meth)acrylate). The copolymerizable monomer may be used as the balance of the monomer components excluding the alkyl (meth)acrylate.

As the copolymerizable monomer and its usage amount, there may be applied a copolymerizable monomer and its usage amount described in paragraph 0029 to paragraph 0042 of JP 2016-157077 A or a copolymerizable monomer and its usage amount described in paragraph 0022 to paragraph 0036 of JP 2016-190996 A.

The monomer components for forming the (meth)acrylic polymer may contain a polyfunctional monomer as required in addition to the monofunctional monomers in order to adjust the cohesive strength of the pressure-sensitive adhesive.

The polyfunctional monomer is a monomer having at least two polymerizable functional groups each having an unsaturated double bond, such as a (meth)acryloyl group or a vinyl group, and examples thereof include: ester compounds of polyhydric alcohols and (meth)acrylic acid, such as (poly)ethylene glycol di(meth)acrylate, (poly)propylene glycol di(meth)acrylate, neopentyl glycol di(meth)acrylate, pentaerythritol di(meth)acrylate, pentaerythritol tri(meth) acrylate, dipentaerythritol hexa(meth)acrylate, 1,2-ethylene glycol di(meth)acrylate, 1,6-hexanediol trimethylolpropane tri(meth)acrylate, and tetramethylolmethane tri(meth)acrylate; and allyl (meth)acrylate, vinyl (meth)acrylate, divinylbenzene, epoxy acrylate, polyester acrylate, urethane acrylate, butyl di(meth)acrylate, and hexyl di(meth)acrylate. Of those, trimethylolpropane tri(meth)acrylate, hexanediol di(meth)acrylate, and dipentaerythritol hexa(meth)acrylate may be suitably used. The polyfunctional monomers may be used alone or in combination thereof.

The usage amount of the polyfunctional monomer varies depending on, for example, its molecular weight and number of functional groups, but the polyfunctional monomer is used at preferably 3 parts by weight or less, more preferably 2 parts by weight or less, still more preferably 1 part by weight or less with respect to 100 parts by weight in total of the monofunctional monomers. In addition, the lower limit value thereof is not particularly limited, but is preferably 0 parts by weight or more, more preferably 0.001 part by weight or more. When the usage amount of the polyfunctional monomer falls within the above-mentioned ranges, adhesive strength can be improved.

The (meth)acrylic polymer may be produced by any appropriate method. For example, radical polymerization methods, including solution polymerization, radiation polymerization such as ultraviolet (UV) polymerization, bulk polymerization, and emulsion polymerization, may each be appropriately selected. Any of various known azo-based and peroxide-based initiators may be used as a radical polymerization initiator. A reaction temperature is generally set to from about 50° C. to about 80° C., and a reaction time is set to from 1 hour to 8 hours. In addition, of the above-mentioned production methods, a solution polymerization method is preferred, and ethyl acetate, toluene, or the like is generally used as a solvent for the (meth)acrylic polymer. A solution concentration is generally set to from about 20 wt % to about 80 wt %. In addition, the (meth) acrylic polymer to be obtained may be any of a random copolymer, a block copolymer, a graft copolymer, and the like.

The pressure-sensitive adhesive composition may contain a cross-linking agent. Examples of the cross-linking agent include an isocyanate-based cross-linking agent, an epoxy-based cross-linking agent, a silicone-based cross-linking agent, an oxazoline-based cross-linking agent, an aziridine-based cross-linking agent, a silane-based cross-linking agent, an alkyl etherified melamine-based cross-linking agent, a metal chelate-based cross-linking agent, and a peroxide. The cross-linking agents may be used alone or in combination thereof. Of those, an isocyanate-based cross-linking agent is preferably used.

A blending ratio between the (meth)acrylic polymer and the cross-linking agent is generally preferably from about 0.001 part by weight to about 20 parts by weight, more preferably from about 0.01 part by weight to about 15 parts by weight of the cross-linking agent (solid content) with respect to 100 parts by weight of the (meth)acrylic polymer (solid content).

The pressure-sensitive adhesive composition may further contain, as required, various additives, such as: a UV absorber; a tackifier, such as a rosin derivative resin, a polyterpene resin, a petroleum resin, or an oil-soluble phenol resin; a plasticizer; a filler such as a hollow glass balloon; a pigment; a colorant; an antioxidant; an age resistor; and a silane coupling agent. The usage amount of the additive may be appropriately set in accordance with purposes. For example, the usage amount of the silane coupling agent is preferably 1 part by weight or less, more preferably from 0.01 part by weight to 1 part by weight, still more preferably from 0.02 part by weight to 0.6 part by weight with respect to 100 parts by weight of the monofunctional monomer components for forming the (meth)acrylic polymer.

The pressure-sensitive adhesive composition is preferably adjusted to a viscosity suited for application work. The adjustment of the viscosity may be performed by, for example, adding a thickening polymer, a polyfunctional monomer, or the like, or partially polymerizing the monomer components in the pressure-sensitive adhesive composition. The partial polymerization may be performed before the addition of a thickening polymer, a polyfunctional monomer, or the like, or may be performed after the addition. The viscosity of the pressure-sensitive adhesive composition may change depending on, for example, the composition of the monomer components, and the kind and blending amount of the additive, and hence it is difficult to unambiguously determine a preferred polymerization ratio of the partial polymerization, but the polymerization ratio may be, for example, about 20% or less, preferably from 3% to 20%, more preferably from about 5% to about 15%. When the polymerization ratio in the partial polymerization is more than 20%, the viscosity becomes so high as to make the application to the substrate difficult.

A-5. Second Pressure-Sensitive Adhesive Layer

The second pressure-sensitive adhesive layer 40 has a smaller pressure-sensitive adhesive strength to glass than the first pressure-sensitive adhesive layer. The pressure-sensitive adhesive strength to glass of the second pressure-sensitive adhesive layer is, for example, from 0.01 N/25 mm to 1.0 N/25 mm, preferably from 0.01 N/25 mm to 0.8 N/25 mm, more preferably from 0.015 N/25 mm to 0.5 N/25 mm, still more preferably from 0.02 N/25 mm to 0.25 N/25 mm. When the pressure-sensitive adhesive strength to glass falls within the above-mentioned ranges, while the polarizing film laminate can maintain a state of being bonded to a barrier, the polarizing film laminate can be easily peeled from the barrier.

In one embodiment, the pressure-sensitive adhesive strength to glass of the second pressure-sensitive adhesive layer may be, for example, from 0.1% to 40%, from 0.1% to 25%, or from 0.5% to 10% of the pressure-sensitive adhesive strength to glass of the first pressure-sensitive adhesive layer. When the ratio between the pressure-sensitive adhesive strengths to glass falls within the above-mentioned ranges, while the polarizing film laminate can maintain a state of being bonded to a barrier, the polarizing film laminate can be easily peeled from the barrier.

The second pressure-sensitive adhesive layer is formed by applying a pressure-sensitive adhesive composition to any of various substrates and performing drying, radiation irradiation, and the like as required. For example, the second pressure-sensitive adhesive layer may be formed on a release film and bonded to the supporting substrate together with the release film. Alternatively, the second pressure-sensitive adhesive layer may be formed on a release film, be transferred from the release film to the supporting substrate, and have another release film temporarily bonded thereonto.

The thickness of the second pressure-sensitive adhesive layer is, for example, from 5 μm to 100 μm, preferably from 7 μm to 60 μm, more preferably from 10 μm to 40 μm.

Any appropriate pressure-sensitive adhesive composition may be used as the pressure-sensitive adhesive composition for forming the second pressure-sensitive adhesive layer as long as the above-mentioned pressure-sensitive adhesive strength to glass is achieved.

A-5-1. First Embodiment

In one embodiment, an acrylic pressure-sensitive adhesive composition, a urethane-based pressure-sensitive adhesive composition, a rubber-based pressure-sensitive adhesive composition, or a silicone-based pressure-sensitive adhesive composition may be used as the pressure-sensitive adhesive composition for forming the second pressure-sensitive adhesive layer. Of those, an acrylic pressure-sensitive adhesive composition and a urethane-based pressure-sensitive adhesive composition are preferred because the above-mentioned pressure-sensitive adhesive strength to glass is suitably obtained.

A-5-1-1. Acrylic Pressure-sensitive Adhesive Composition

The acrylic pressure-sensitive adhesive composition typically contains an acrylic polymer and a cross-linking agent. The acrylic polymer is what may be called a base polymer in the field of acrylic pressure-sensitive adhesives. The number of kinds of the acrylic polymers may be only one, or two or more.

The content ratio of the acrylic polymer in the acrylic pressure-sensitive adhesive composition is preferably from 50 wt % to 100 wt %, more preferably from 60 wt % to 100 wt %, still more preferably from 70 wt % to 100 wt %, particularly preferably from 80 wt % to 100 wt %, most preferably from 90 wt % to 100 wt % in terms of solid content.

The weight-average molecular weight of the acrylic polymer is preferably from 100,000 to 3,000,000, more preferably from 150,000 to 2,000,000, still more preferably from 200,000 to 1,500,000, particularly preferably from 250,000 to 1,000,000.

Any appropriate acrylic polymer may be adopted as the acrylic polymer to the extent that the effects of the present invention are obtained. The acrylic polymer is preferably an acrylic polymer formed through polymerization from a composition (A) containing a (meth)acrylic acid alkyl ester whose alkyl ester moiety has an alkyl group having 4 to 12 carbon atoms (component "a"), and at least one kind selected from the group consisting of: a (meth)acrylic acid ester having a OH group; and (meth)acrylic acid (component "b"). The number of kinds of the components "a" and the number of kinds of the components "b" may each be independently only one, or two or more.

Examples of the (meth)acrylic acid alkyl ester whose alkyl ester moiety has an alkyl group having 4 to 12 carbon atoms (component "a") include n-butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate. Of those, n-butyl (meth)acrylate and 2-ethylhexyl (meth)acrylate are preferred, and n-butyl acrylate and 2-ethylhexyl acrylate are more preferred.

Examples of the at least one kind selected from the group consisting of: a (meth)acrylic acid ester having a OH group; and (meth)acrylic acid (component "b") include: (meth)acrylic acid esters each having a OH group, such as hydroxyethyl (meth)acrylate, hydroxypropyl (meth)acrylate, and hydroxybutyl (meth)acrylate; and (meth)acrylic acid. Of those, hydroxyethyl (meth)acrylate and (meth) acrylic acid are preferred, and hydroxyethyl acrylate and acrylic acid are more preferred.

The composition (A) may contain a copolymerizable monomer other than the component "a" and the component "b". The number of kinds of the copolymerizable monomers may be only one, or two or more. Examples of such copolymerizable monomer include: carboxyl group-containing monomers (provided that (meth)acrylic acid is excluded), such as itaconic acid, maleic acid, fumaric acid, crotonic acid, isocrotonic acid, and acid anhydrides thereof (e.g., acid anhydride group-containing monomers, such as maleic anhydride and itaconic anhydride); amide group-containing monomers, such as (meth)acrylamide, N,N-dimethyl (meth)acrylamide, N-methylol (meth)acrylamide, N-methoxymethyl (meth)acrylamide, N-butoxymethyl (meth)acrylamide, and N-hydroxyethyl (meth)acrylamide; amino group-containing monomers, such as aminoethyl (meth)acrylate, dimethylaminoethyl (meth)acrylate, and t-butylaminoethyl (meth)acrylate; epoxy group-containing monomers, such as glycidyl (meth)acrylate and methylglycidyl (meth)acrylate; cyano group-containing monomers, such as acrylonitrile and methacrylonitrile; heterocycle-containing vinyl-based monomers, such as N-vinyl-2-pyrrolidone, (meth)acryloylmorpholine, N-vinylpiperidone, N-vinylpiperazine, N-vinylpyrrole, N-vinyl imidazole, vinylpyridine, vinylpyrimidine, and vinyloxazole; sulfonic acid group-containing monomers such as sodium vinylsulfonate; phosphoric acid group-containing monomers such as 2-hydroxyethylacryloyl phosphate; imide group-containing monomers, such as cyclohexylmaleimide and isopropylmaleimide; isocyanate group-containing monomers such as 2-methacryloyloxyethyl isocyanate; (meth)acrylic acid esters each having an alicyclic hydrocarbon group, such as cyclopentyl (meth)acrylate, cyclohexyl (meth)acrylate, and isobornyl (meth)acrylate; (meth)acrylic acid esters each having an aromatic hydrocarbon group, such as phenyl (meth)acrylate, phenoxyethyl (meth)acrylate, and benzyl (meth)acrylate; vinyl esters, such as vinyl acetate and vinyl propionate; aromatic vinyl compounds, such as styrene and vinyltoluene; olefins and dienes, such as ethylene, butadiene, isoprene, and isobutylene; vinyl ethers such as a vinyl alkyl ether; and vinyl chloride.

A polyfunctional monomer may also be adopted as the copolymerizable monomer. The "polyfunctional monomer" refers to a monomer having two or more ethylenically unsaturated groups in one molecule. Any appropriate ethylenically unsaturated groups may be adopted as the ethylenically unsaturated groups to the extent that the effects of the present invention are obtained. Examples of such ethylenically unsaturated group include radical-polymerizable functional groups, such as a vinyl group, a propenyl group, an isopropenyl group, a vinyl ether group (vinyloxy group), and an allyl ether group (allyloxy group). Examples of the polyfunctional monomer include hexanediol di(meth)acrylate, butanediol di(meth)acrylate, (poly)ethylene glycol di(meth)acrylate, (poly) propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, and urethane acrylate. The number of kinds of such polyfunctional monomers may be only one, or two or more.

A (meth)acrylic acid alkoxyalkyl ester may also be adopted as the copolymerizable monomer. Examples of the (meth)acrylic acid alkoxyalkyl ester include 2-methoxyethyl (meth)acrylate, 2-ethoxyethyl (meth)acrylate, methoxytriethylene glycol (meth)acrylate, 3-methoxypropyl (meth)acrylate, 3-ethoxypropyl (meth)acrylate, 4-methoxybutyl (meth)acrylate, and 4-ethoxybutyl (meth)acrylate. The number of kinds of the (meth)acrylic acid alkoxyalkyl esters may be only one, or two or more.

The content of the (meth)acrylic acid alkyl ester whose alkyl ester moiety has an alkyl group having 4 to 12 carbon atoms (component "a") is preferably 50 wt % or more, more preferably from 60 wt % to 100 wt %, still more preferably from 70 wt % to 100 wt %, particularly preferably from 80 wt % to 100 wt % with respect to the total amount (100 wt %) of the monomer components for forming the acrylic polymer.

The content of the at least one kind selected from the group consisting of: a (meth)acrylic acid ester having a OH group; and (meth)acrylic acid (component "b") is preferably 0.1 wt % or more, more preferably from 1.0 wt % to 50 wt %, still more preferably from 1.5 wt % to 40 wt %, particularly preferably from 2.0 wt % to 30 wt % with respect to the total amount (100 wt %) of the monomer components for forming the acrylic polymer.

The composition (A) may contain any appropriate other component to the extent that the effects of the present invention are not impaired. Examples of such other component include a polymerization initiator, a chain transfer agent, and a solvent. Any appropriate content may be adopted as the content of each of those other components to the extent that the effects of the present invention are not impaired.

The acrylic pressure-sensitive adhesive composition may contain a cross-linking agent. When the cross-linking agent is used, the cohesive strength of the acrylic pressure-sensitive adhesive can be improved. The number of kinds of the cross-linking agents may be only one, or two or more.

Examples of the cross-linking agent include a polyfunctional isocyanate-based cross-linking agent, an epoxy-based cross-linking agent, a melamine-based cross-linking agent, and a peroxide-based cross-linking agent, and as well, a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and an amine-based cross-linking agent. Of those, at least one kind selected from the group consisting of: a polyfunctional isocyanate-based cross-linking agent; and an epoxy-based cross-linking agent (component "c") is preferred.

Examples of the polyfunctional isocyanate-based cross-linking agent include: lower aliphatic polyisocyanates, such as 1,2-ethylene diisocyanate, 1,4-butylene diisocyanate, and 1,6-hexamethylene diisocyanate; alicyclic polyisocyanates, such as cyclopentylene diisocyanate, cyclohexylene diisocyanate, isophorone diisocyanate, hydrogenated tolylene diisocyanate, and hydrogenated xylene diisocyanate; and aromatic polyisocyanates, such as 2,4-tolylene diisocyanate, 2,6-tolylene diisocyanate, 4,4'-diphenylmethane diisocyanate, and xylylene diisocyanate. Examples of the polyfunctional isocyanate-based cross-linking agent also include commercially available products, such as a trimethylolpropane/tolylene diisocyanate adduct (manufactured by Nippon Polyurethane Industry Co., Ltd., product name: "CORONATE L"), a trimethylolpropane/hexamethylene diisocyanate adduct (manufactured by Nippon Polyurethane Industry Co., Ltd., product name: "CORONATE HL"), a product available under the product name "CORONATE HX" (Nippon Polyurethane Industry Co., Ltd.), and a trimethylolpropane/xylylene diisocyanate adduct (manufactured by Mitsui Chemicals, Inc., product name: "TAKENATE 110N").

Examples of the epoxy-based cross-linking agent (polyfunctional epoxy compound) include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcinol diglycidyl ether, bisphenol-S-diglycidyl ether, and an epoxy-based resin having two or more epoxy groups in a molecule thereof. Examples of the epoxy-based cross-linking agent also include commercially available products such as a product available under the product name "TETRAD-C" (manufactured by Mitsubishi Gas Chemical Company, Inc.).

Any appropriate content may be adopted as the content of the cross-linking agent in the acrylic pressure-sensitive adhesive composition to the extent that the effects of the present invention are not impaired. The content of the cross-linking agent in the acrylic pressure-sensitive adhesive composition is, for example, preferably from 0.1 part by weight to 5.0 parts by weight, more preferably from 0.2 part by weight to 4.5 parts by weight, still more preferably from 0.3 part by weight to 4.0 parts by weight, particularly preferably from 0.4 part by weight to 3.5 parts by weight with respect to the solid content of the acrylic polymer (100 parts by weight).

The acrylic pressure-sensitive adhesive composition may contain any appropriate other component to the extent that the effects of the present invention are not impaired. Examples of such other component include a polymer component other than the acrylic polymer, a cross-linking accelerator, a cross-linking catalyst, a silane coupling agent, a tackifier resin (such as a rosin derivative, a polyterpene resin, a petroleum resin, or an oil-soluble phenol), an age resistor, an inorganic filler, an organic filler, metal powder, a colorant (e.g., a pigment or a dye), a foil-like material, a deterioration-preventing agent, a chain transfer agent, a plasticizer, a softening agent, a surfactant, an antistatic agent, a conductive agent, a stabilizer, a surface lubricant, a leveling agent, a corrosion inhibitor, a heat stabilizer, a polymerization inhibitor, a lubricant, a solvent, and a catalyst.

The acrylic pressure-sensitive adhesive composition preferably contains a deterioration-preventing agent because the effects of the present invention can be further expressed. Examples of the deterioration-preventing agent include an antioxidant, a UV absorber, and a light stabilizer. The number of kinds of the deterioration-preventing agents may be only one, or two or more.

Examples of the antioxidant include a radical chain inhibitor (e.g., a phenol-based antioxidant or an amine-based antioxidant) and a peroxide decomposer (e.g., a sulfur-based antioxidant or a phosphorus-based antioxidant).

Examples of the UV absorber include a benzophenone-based UV absorber, a benzotriazole-based UV absorber, a salicylic acid-based UV absorber, an oxanilide-based UV absorber, a cyanoacrylate-based UV absorber, and a triazine-based UV absorber. The blending ratio of the UV absorber in the acrylic pressure-sensitive adhesive composition is, for example, from 0.3 wt % to 5.0 wt %, preferably 0.5 wt % to 3.0 wt % in terms of solid content.

Examples of the benzophenone-based UV absorber include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-dimethoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane.

Examples of the benzotriazole-based UV absorber include 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-(3",4",5",6"-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol], and 2-(2'-hydroxy-5'-methacryloxyphenyl)-2H-benzotriazole.

Examples of the salicylic acid-based UV absorber include phenyl salicylate, p-tert-butylphenyl salicylate, and p-octylphenyl salicylate.

Examples of the cyanoacrylate-based UV absorber include 2-ethylhexyl-2-cyano-3,3'-diphenyl acrylate and ethyl-2-cyano-3,3'-diphenyl acrylate.

Examples of the light stabilizer include a hindered amine-based light stabilizer and a UV stabilizer. Examples of the hindered amine-based light stabilizer may include bis(2,2,6,6-tetramethyl-4-piperidyl) sebacate, bis(1,2,2,6,6-pentamethyl-4-piperidyl) sebacate, and methyl-1,2,2,6,6-pentamethyl-4-piperidyl sebacate. Examples of the UV stabilizer include nickel bis(octylphenyl)sulfide, [2,2'-thiobis(4-tert-octylphenolato)]-n-butylamine nickel, nickel complex-3,5-di-tert-butyl-4-hydroxybenzyl-phosphate monoethylate, a benzoate-type quencher, and nickel-dibutyl dithiocarbamate.

A-5-1-2. Urethane-Based Pressure-Sensitive Adhesive Composition

The urethane-based pressure-sensitive adhesive composition contains at least one kind selected from the group consisting of: a urethane prepolymer; and a polyol, and a cross-linking agent. The at least one kind selected from the group consisting of: a urethane prepolymer; and a polyol is what may be called a base polymer in the field of urethane-based pressure-sensitive adhesives. The urethane prepolymer and the polyol serving as the base polymer may each serve as a component (urethane-based polymer) of the urethane-based pressure-sensitive adhesive composition in combination with the cross-linking agent.

[Urethane Prepolymer]

The urethane prepolymer is preferably a polyurethane polyol, more preferably a product obtained by allowing one of a polyester polyol (a1) or a polyether polyol (a2) alone, or a mixture of (a1) and (a2) to react with an organic polyisocyanate compound (a3) in the presence or absence of a catalyst. The urethane prepolymers may be used alone or in combination thereof.

Any appropriate polyester polyol may be used as the polyester polyol (a1). Such polyester polyol (a1) is, for example, a polyester polyol obtained by allowing an acid component and a glycol component to react with each other. Examples of the acid component include terephthalic acid, adipic acid, azelaic acid, sebacic acid, phthalic anhydride, isophthalic acid, and trimellitic acid. Examples of the glycol component include ethylene glycol, propylene glycol, diethylene glycol, butylene glycol, 1,6-hexane glycol, 3-methyl-1,5-pentanediol, 3,3'-dimethylolheptane, polyoxyethylene glycol, polyoxypropylene glycol, 1,4-butanediol, neopentyl glycol, butylethylpentanediol, and glycerin, trimethylolpropane, or pentaerythritol serving as a polyol component. Other examples of the polyester polyol (a1) include polyester polyols obtained by subjecting lactones, such as polycaprolactone, poly(β-methyl-γ-valerolactone), and polyvalerolactone, to ring-opening polymerization.

Any value in the range of from a low molecular weight to a high molecular weight may be used as the molecular weight of the polyester polyol (a1). The molecular weight of the polyester polyol (a1) is preferably from 100 to 100,000 in terms of number-average molecular weight. When the number-average molecular weight is less than 100, there is a risk in that the reactivity of the polyol becomes higher, and hence the polyol is liable to gel. When the number-average molecular weight is more than 100,000, there is a risk in that the reactivity reduces, and the cohesive strength of the polyurethane polyol itself reduces. The usage amount of the polyester polyol (a1) is preferably from 0 mol % to 90 mol % in the polyols forming the polyurethane polyol.

Any appropriate polyether polyol may be used as the polyether polyol (a2). Such polyether polyol (a2) is, for example, a polyether polyol obtained by polymerizing an oxirane compound, such as ethylene oxide, propylene oxide, butylene oxide, or tetrahydrofuran, through use of water or a low-molecular weight polyol, such as propylene glycol, ethylene glycol, glycerin, or trimethylolpropane, as an initiator. Such polyether polyol (a2) is specifically, for example, a polyether polyol having 2 or more functional groups, such as polypropylene glycol, polyethylene glycol, or polytetramethylene glycol.

Any value in the range of from a low molecular weight to a high molecular weight may be used as the molecular weight of the polyether polyol (a2). The molecular weight of the polyether polyol (a2) is preferably from 100 to 100,000 in terms of number-average molecular weight. When the number-average molecular weight is less than 100, there is a risk in that the reactivity of the polyol becomes higher, and hence the polyol is liable to gel. When the number-average molecular weight is more than 100,000, there is a risk in that the reactivity reduces, and the cohesive strength of the polyurethane polyol itself reduces. The usage amount of the polyether polyol (a2) is preferably from 0 mol % to 90 mol % in the polyols forming the polyurethane polyol.

A product obtained by substituting part of the polyether polyol (a2) with, for example, a glycol, such as ethylene glycol, 1,4-butanediol, neopentyl glycol, butylethylpentanediol, glycerin, trimethylolpropane, or pentaerythritol, or a polyvalent amine, such as ethylenediamine, N-aminoethylethanolamine, isophoronediamine, or xylylenediamine, as required may be used in combination.

Only a bifunctional polyether polyol may be used as the polyether polyol (a2), or a polyether polyol having a number-average molecular weight of from 100 to 100,000 and having at least 3 hydroxy groups in a molecule thereof may be used as part or the entirety of the polyether polyol (a2). When the polyether polyol having a number-average molecular weight of from 100 to 100,000 and having at least 3 hydroxy groups in a molecule thereof is used as part or the entirety of the polyether polyol (a2), a balance between the pressure-sensitive adhesive strength and peelability of the pressure-sensitive adhesive layer can become satisfactory. When the number-average molecular weight in such polyether polyol is less than 100, there is a risk in that its reactivity becomes higher, and hence the polyol is liable to gel. In addition, when the number-average molecular weight in such polyether polyol is more than 100,000, there is a risk in that the reactivity reduces, and the cohesive strength of the polyurethane polyol itself reduces. The number-average molecular weight of such polyether polyol is more preferably from 100 to 10,000.

Any appropriate organic polyisocyanate compound may be used as the organic polyisocyanate compound (a3). Examples of such organic polyisocyanate compound (a3) include an aromatic polyisocyanate, an aliphatic polyisocyanate, an aromatic aliphatic polyisocyanate, and an alicyclic polyisocyanate.

Examples of the aromatic polyisocyanate include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatotoluene, 1,3,5-triisocyanatobenzene, dianisidine diisocyanate, 4,4'-diphenyl ether diisocyanate, and 4,4',4"-triphenylmethane triisocyanate.

Examples of the aliphatic polyisocyanate include trimethylene diisocyanate, tetramethylene diisocyanate, hexamethylene diisocyanate, pentamethylene diisocyanate, 1,2-propylene diisocyanate, 2,3-butylene diisocyanate, 1,3- butylene diisocyanate, dodecamethylene diisocyanate, and 2,4,4-trimethylhexamethylene diisocyanate.

Examples of the aromatic aliphatic polyisocyanate include ω,ω'-diisocyanato-1,3-dimethylbenzene, ω,ω'-diisocyanato-1,4-dimethylbenzene, ω,ω'-diisocyanato-1,4-diethylbenzene, 1,4-tetramethylxylylene diisocyanate, and 1,3-tetramethylxylylene diisocyanate.

Examples of the alicyclic polyisocyanate include 3-isocyanatomethyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), 1,4-bis(isocyanatomethyl)cyclohexane, and 1,4-bis(isocyanatomethyl)cyclohexane.

A trimethylolpropane adduct of any such compound as described above, a biuret thereof formed by a reaction with water, a trimer thereof having an isocyanurate ring, or the like may be used as the organic polyisocyanate compound (a3) in combination with the above-mentioned compound.

Any appropriate catalyst may be used as a catalyst that may be used in obtaining the polyurethane polyol. Examples of such catalyst include a tertiary amine-based compound and an organometallic compound.

Examples of the tertiary amine-based compound include triethylamine, triethylenediamine, and 1,8-diazabicyclo(5,4,0)-undecene-7 (DBU).

Examples of the organometallic compound include a tin-based compound and a non-tin-based compound.

Examples of the tin-based compound include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, and tin 2-ethylhexanoate.

Examples of the non-tin-based compound include: titanium-based compounds, such as dibutyltitanium dichloride, tetrabutyl titanate, and butoxytitanium trichloride; lead-based compounds, such as lead oleate, lead 2-ethylhexanoate, lead benzoate, and lead naphthenate; iron-based compounds, such as iron 2-ethylhexanoate and iron acetylacetonate; cobalt-based compounds, such as cobalt benzoate and cobalt 2-ethylhexanoate; zinc-based compounds, such as zinc naphthenate and zinc 2-ethylhexanoate; and zirconium-based compounds such as zirconium naphthenate.

When the catalyst is used in obtaining the polyurethane polyol, in a system where the two kinds of polyols, that is, the polyester polyol and the polyether polyol are present, a single catalyst system is liable to cause a problem in that the polyols gel or a reaction solution becomes cloudy owing to a difference in reactivity between the polyols. In view of the foregoing, when two kinds of catalysts are used in obtaining the polyurethane polyol, it becomes easier to control a reaction rate, the selectivity of the catalysts, and the like, and hence such problem can be solved. Examples of the combination of such two kinds of catalysts include: the combination of a tertiary amine-based compound and an organometallic compound; the combination of a tin-based compound and a non-tin-based compound; and the combination of a tin-based compound and another tin-based compound. Of those, the combination of a tin-based compound and another tin-based compound is preferred, and the combination of dibutyltin dilaurate and tin 2-ethylhexanoate is more preferred. A blending ratio "tin 2-ethylhexanoate/dibutyltin dilaurate" is preferably less than 1, more preferably from 0.2 to 0.6 in terms of weight ratio. When the blending ratio is 1 or more, the polyols may be liable to gel owing to a poor balance between the catalytic activities of the catalysts.

When the catalyst is used in obtaining the polyurethane polyol, the usage amount of the catalyst is preferably from 0.01 wt % to 1.0 wt % with respect to the total amount of the polyester polyol (a1), the polyether polyol (a2), and the organic polyisocyanate compound (a3).

When the catalyst is used in obtaining the polyurethane polyol, a reaction temperature is preferably less than 100° C., more preferably from 85° C. to 95° C. When the temperature is 100° C. or more, it may be difficult to control the reaction rate and the cross-linked structure of the polyurethane polyol, and hence it may become difficult to obtain a polyurethane polyol having a predetermined molecular weight.

No catalyst may be used in obtaining the polyurethane polyol. In that case, the reaction temperature is preferably 100° C. or more, more preferably 110° C. or more. In addition, when the polyurethane polyol is obtained in the absence of any catalyst, the polyols (a1) and/or (a2), and the compound (a3) are preferably allowed to react with each other for 3 hours or more.

A method of obtaining the polyurethane polyol is, for example, (1) a method involving loading the total amount of the polyester polyol, the polyether polyol, the catalyst, and the organic polyisocyanate compound into a flask, or (2) a method involving loading the polyester polyol, the polyether polyol, and the catalyst into a flask, and adding the organic polyisocyanate compound to the mixture. Of those, the method (2) is preferred as a method of obtaining the polyurethane polyol in terms of the control of the reaction.

Any appropriate solvent may be used in obtaining the polyurethane polyol. Examples of such solvent include methyl ethyl ketone, ethyl acetate, toluene, xylene, and acetone. Of those solvents, toluene is preferred.

[Polyol]

Preferred examples of the polyol include polyester polyol, polyether polyol, polycaprolactone polyol, polycarbonate polyol, and castor oil-based polyol. The polyol is more preferably polyether polyol. The polyols may be used alone or in combination thereof.

The polyester polyol may be obtained through, for example, an esterification reaction between a polyol component and an acid component.

Examples of the polyol component include ethylene glycol, diethylene glycol, 1,3-butanediol, 1,4-butanediol, neopentyl glycol, 3-methyl-1,5-pentanediol, 2-butyl-2-ethyl-1,3-propanediol, 2,4-diethyl-1,5-pentanediol, 1,2-hexanediol, 1,6-hexanediol, 1,8-octanediol, 1,9-nonanediol, 2-methyl-1,8-octanediol, 1,8-decanediol, octadecanediol, glycerin, trimethylolpropane, pentaerythritol, hexanetriol, and polypropylene glycol. Examples of the acid component include succinic acid, methylsuccinic acid, adipic acid, pimelic acid, azelaic acid, sebacic acid, 1,12-dodecanedioic acid, 1,14-tetradecanedioic acid, dimer acid, 2-methyl-1,4-cyclohexanedicarboxylic acid, 2-ethyl-1,4-cyclohexanedicarboxylic acid, terephthalic acid, isophthalic acid, phthalic acid, 1,4-naphthalenedicarboxylic acid, 4,4'-biphenyldicarboxylic acid, and acid anhydrides thereof.

An example of the polyether polyol is a polyether polyol obtained by subjecting water, a low-molecular polyol (e.g., propylene glycol, ethylene glycol, glycerin, trimethylolpropane, or pentaerythritol), a bisphenol (e.g., bisphenol A), or a dihydroxybenzene (e.g., catechol, resorcin, or hydroquinone) serving as an initiator to addition polymerization with an alkylene oxide, such as ethylene oxide, propylene oxide, or butylene oxide. Specific examples thereof include polyethylene glycol, polypropylene glycol, and polytetramethylene glycol.

An example of the polycaprolactone polyol is a caprolactone-based polyester diol obtained by subjecting a cyclic ester monomer, such as ε-caprolactone or σ-valerolactone, to ring-opening polymerization.

Examples of the polycarbonate polyol include: a polycarbonate polyol obtained by subjecting the polyol component and phosgene to a polycondensation reaction; a polycarbonate polyol obtained by subjecting the polyol component and a carbonate diester, such as dimethyl carbonate, diethyl carbonate, dipropyl carbonate, diisopropyl carbonate, dibutyl carbonate, ethylbutyl carbonate, ethylene carbonate, propylene carbonate, diphenyl carbonate, or dibenzyl carbonate, to transesterification condensation; a copolymerized polycarbonate polyol obtained by using two or more kinds of the polyol components in combination; a polycarbonate polyol obtained by subjecting any of the various polycarbonate polyols and a carboxyl group-containing compound to an esterification reaction; a polycarbonate polyol obtained by subjecting any of the various polycarbonate polyols and a hydroxyl group-containing compound to an etherification reaction; a polycarbonate polyol obtained by subjecting any of the various polycarbonate polyols and an ester compound to a transesterification reaction; a polycarbonate polyol obtained by subjecting any of the various polycarbonate polyols and a hydroxyl group-containing compound to a transesterification reaction; a polyester-based polycarbonate polyol obtained by subjecting any of the various polycarbonate polyols and a dicarboxylic acid compound to a polycondensation reaction; and a copolymerized polyether-based polycarbonate polyol obtained by subjecting any of the various polycarbonate polyols and an alkylene oxide to copolymerization.

An example of the castor oil-based polyol is a castor oil-based polyol obtained by allowing a castor oil fatty acid and the polyol component to react with each other. A specific example thereof is a castor oil-based polyol obtained by allowing a castor oil fatty acid and polypropylene glycol to react with each other.

The number-average molecular weight Mn of the polyols is preferably from 300 to 100,000, more preferably from 400 to 75,000, still more preferably from 450 to 50,000, particularly preferably from 500 to 30,000.

The polyols preferably contain a polyol (A1) having 3 OH groups and having a number-average molecular weight Mn of from 300 to 100,000. The number of kinds of the polyols (A1) may be only one, or two or more.

The content ratio of the polyol (A1) in the polyols is preferably 5 wt % or more, more preferably from 25 wt % to 100 wt %, still more preferably from 50 wt % to 100 wt %.

The number-average molecular weight Mn of the polyol (A1) is preferably from 1,000 to 100,000, more preferably more than 1,000 and 80,000 or less, still more preferably from 1,100 to 70,000, still more preferably from 1,200 to 60,000, still more preferably from 1,300 to 50,000, still more preferably from 1,400 to 40,000, still more preferably from 1,500 to 35,000, particularly preferably from 1,700 to 32,000, most preferably from 2,000 to 30,000.

The polyol may contain a polyol (A2) having 3 or more OH groups and having a number-average molecular weight Mn of 20,000 or less. The number of kinds of the polyols (A2) may be only one, or two or more. The number-average molecular weight Mn of the polyol (A2) is preferably from 100 to 20,000, more preferably from 150 to 10,000, still more preferably from 200 to 7,500, particularly preferably from 300 to 6,000, most preferably from 300 to 5,000. Preferred examples of the polyol (A2) include a polyol having 3 OH groups (triol), a polyol having 4 OH groups (tetraol), a polyol having 5 OH groups (pentaol), and a polyol having 6 OH groups (hexaol).

The total amount of the polyol having 4 OH groups (tetraol), the polyol having 5 OH groups (pentaol), and the polyol having 6 OH groups (hexaol) each serving as the polyol (A2) is preferably 70 wt % or less, more preferably 60 wt % or less, still more preferably 40 wt % or less, particularly preferably 30 wt % or less as a content ratio in the polyols.

The content ratio of the polyol (A2) in the polyols is preferably 95 wt % or less, more preferably from 0 wt % to 75 wt %.

The content ratio of a polyol having 4 or more OH groups and having a number-average molecular weight Mn of 20,000 or less serving as the polyol (A2) is preferably less than 70 wt %, more preferably 60 wt % or less, still more preferably 50 wt % or less, particularly preferably 40 wt % or less, most preferably 30 wt % or less with respect to the entirety of the polyols.

[Cross-Linking Agent]

The cross-linking agent is preferably a polyfunctional isocyanate-based cross-linking agent. Any appropriate polyfunctional isocyanate-based cross-linking agent that may be used for a urethanization reaction may be adopted as the polyfunctional isocyanate-based cross-linking agent. Examples of such polyfunctional isocyanate-based cross-linking agent include: lower aliphatic polyisocyanates, such as 1,2-ethylene diisocyanate, 1,4-butylene diisocyanate, and 1,6-hexamethylene diisocyanate; alicyclic polyisocyanates, such as cyclopentylene diisocyanate, cyclohexylene diisocyanate, isophorone diisocyanate, hydrogenated tolylene diisocyanate, and hydrogenated xylene diisocyanate; and aromatic polyisocyanates, such as 2,4-tolylene diisocyanate, 2,6-tolylene diisocyanate, 4,4'-diphenylmethane diisocyanate, and xylylene diisocyanate. Examples of the polyfunctional isocyanate-based cross-linking agent also include commercially available products, such as a trimethylolpropane/tolylene diisocyanate adduct (manufactured by Nippon Polyurethane Industry Co., Ltd., product name: "CORONATE L"), a trimethylolpropane/hexamethylene diisocyanate adduct (manufactured by Nippon Polyurethane Industry Co., Ltd., product name: "CORONATE HL"), a product available under the product name "CORONATE HX" (Nippon Polyurethane Industry Co., Ltd.), and a trimethylolpropane/xylylene diisocyanate adduct (manufactured by Mitsui Chemicals, Inc., product name: "TAKENATE 110N").

[Other Components]

The urethane-based pressure-sensitive adhesive composition may contain any appropriate other component to the extent that the effects of the present invention are not impaired. Examples of such other component include a polymer component other than the urethane-based polymer, a cross-linking accelerator, a cross-linking catalyst, a silane coupling agent, a tackifier resin (e.g., a rosin derivative, a polyterpene resin, a petroleum resin, or an oil-soluble phenol), an age resistor, an inorganic filler, an organic filler, metal powder, a colorant (e.g., a pigment or a dye), a foil-like material, a deterioration-preventing agent, a chain transfer agent, a plasticizer, a softening agent, a surfactant, an antistatic agent, a conductive agent, a stabilizer, a surface lubricant, a leveling agent, a corrosion inhibitor, a heat stabilizer, a polymerization inhibitor, a lubricant, a solvent, and a catalyst.

The urethane-based pressure-sensitive adhesive composition preferably contains a deterioration-preventing agent because the effects of the present invention can be further expressed. The deterioration-preventing agent and its blending ratio are as exemplified for the acrylic pressure-sensitive adhesive composition.

[Urethane-Based Polymer Formed from Urethane-Based Pressure-Sensitive Adhesive Composition Containing Urethane Prepolymer and Polyfunctional Isocyanate-Based Cross-Linking Agent]

The number of kinds of the urethane prepolymers may be only one, or two or more. The number of kinds of the polyfunctional isocyanate-based cross-linking agents may be only one, or two or more.

Any appropriate production method may be adopted as a method of forming the urethane-based polymer from the urethane-based pressure-sensitive adhesive composition containing the urethane prepolymer and the polyfunctional isocyanate-based cross-linking agent as long as the production method is a method of producing a urethane-based polymer through use of a so-called "urethane prepolymer" as a raw material.

The number-average molecular weight Mn of the urethane prepolymer is preferably from 3,000 to 1,000,000.

An equivalent ratio "NCO group/OH group" between an NCO group and a OH group in the urethane prepolymer and the polyfunctional isocyanate-based cross-linking agent is preferably 5.0 or less, more preferably from 0.01 to 4.75, still more preferably from 0.02 to 4.5, particularly preferably from 0.03 to 4.25, most preferably from 0.05 to 4.0.

The content ratio of the polyfunctional isocyanate-based cross-linking agent is preferably from 0.01 part by weight to 30 parts by weight, more preferably from 0.05 part by weight to 25 parts by weight, still more preferably from 0.1 part by weight to 20 parts by weight, particularly preferably from 0.5 part by weight to 17.5 parts by weight, most preferably from 1 part by weight to 15 parts by weight with respect to 100 parts by weight of the urethane prepolymer.

[Urethane-Based Polymer Formed from Urethane-Based Pressure-Sensitive Adhesive Composition Containing Polyol and Polyfunctional Isocyanate-Based Cross-Linking Agent]

The number of kinds of the polyols may be only one, or two or more. The number of kinds of the polyfunctional isocyanate-based cross-linking agents may be only one, or two or more.

An equivalent ratio "NCO group/OH group" between an NCO group and a OH group in the polyol and the polyfunctional isocyanate-based cross-linking agent is preferably 5.0 or less, more preferably from 0.1 to 3.0, still more preferably from 0.2 to 2.5, particularly preferably from 0.3 to 2.25, most preferably from 0.5 to 2.0.

The content ratio of the polyfunctional isocyanate-based cross-linking agent is preferably from 1.0 part by weight to 30 parts by weight, more preferably from 1.5 parts by weight to 27 parts by weight, still more preferably from 2.0 parts by weight to 25 parts by weight, particularly preferably from 2.3 parts by weight to 23 parts by weight, most preferably from 2.5 parts by weight to 20 parts by weight with respect to 100 parts by weight of the polyol.

Specifically, the urethane-based polymer formed from the urethane-based pressure-sensitive adhesive composition containing the polyol and the polyfunctional isocyanate-based cross-linking agent is preferably formed by curing the urethane-based pressure-sensitive adhesive composition containing the polyol and the polyfunctional isocyanate-based cross-linking agent. As a method of forming the urethane-based polymer by curing the urethane-based pressure-sensitive adhesive composition containing the polyol and the polyfunctional isocyanate-based cross-linking agent, there may be adopted any appropriate method such as a urethanization reaction method making use of, for example, bulk polymerization or solution polymerization.

A catalyst is preferably used for curing the urethane-based pressure-sensitive adhesive composition containing the polyol and the polyfunctional isocyanate-based cross-linking agent. Examples of such catalyst include an organometallic compound and a tertiary amine compound.

Examples of the organometallic compound may include an iron-based compound, a tin-based compound, a titanium-based compound, a zirconium-based compound, a lead-based compound, a cobalt-based compound, and a zinc-based compound. Of those, an iron-based compound and a tin-based compound are preferred from the viewpoints of a reaction rate and the pot life of the pressure-sensitive adhesive layer.

Examples of the tertiary amine compound include triethylamine, triethylenediamine, and 1,8-diazabicyclo-(5,4,0)-undecene-7.

The number of kinds of the catalysts may be only one, or two or more. In addition, the catalyst may be used in combination with, for example, a cross-linking retarder. The amount of the catalyst is preferably from 0.005 part by weight to 1.00 part by weight, more preferably from 0.01 part by weight to 0.75 part by weight, still more preferably from 0.01 part by weight to 0.50 part by weight, particularly preferably from 0.01 part by weight to 0.20 part by weight with respect to 100 parts by weight of the polyol.

A-5-1-3. Rubber-Based Pressure-Sensitive Adhesive Composition

As the rubber-based pressure-sensitive adhesive composition, there may be adopted, for example, any appropriate rubber-based pressure-sensitive adhesive composition such as a known rubber-based pressure-sensitive adhesive composition described in JP 2015-074771 A or the like. The number of kinds thereof may be only one, or two or more. The rubber-based pressure-sensitive adhesive composition may contain any appropriate component to the extent that the effects of the present invention are not impaired.

A-5-1-4. Silicone-Based Pressure-Sensitive Adhesive Composition

As the silicone-based pressure-sensitive adhesive composition, there may be adopted, for example, any appropriate silicone-based pressure-sensitive adhesive composition such as a known silicone-based pressure-sensitive adhesive composition described in JP 2014-047280 A or the like. The number of kinds thereof may be only one, or two or more. The silicone-based pressure-sensitive adhesive composition may contain any appropriate component to the extent that the effects of the present invention are not impaired.

A-5-2. Second Embodiment

In another embodiment, a pressure-sensitive adhesive composition containing a thermoplastic elastomer and a plasticizer may be used as the pressure-sensitive adhesive composition for forming the second pressure-sensitive adhesive layer. When the thermoplastic elastomer and the plasticizer are used in combination, there can be obtained a second pressure-sensitive adhesive layer exhibiting a property of being bondable to an adherend surface without further application of pressure or heat other than a pressure caused by the gravity applied to the polarizing film laminate itself (also referred to as "self-pressure-sensitive adhesive property").

A polymer including block segments each formed of a styrene monomer unit or a rubber monomer unit is preferably used as the thermoplastic elastomer because the use of the plasticizer in combination therewith can improve the self-pressure-sensitive adhesive property through a reduction in cohesive strength. Specific examples of such polymer include a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, a styrene-isoprene (SI) rubber, a styrene-butadiene (SB) rubber, and a styrene-ethylene-propylene block copolymer (SEP) rubber. Of those, SEBS and SEPS are preferred.

The weight-average molecular weight of the thermoplastic elastomer (e.g., SEPS) is, for example, from 15,000 to 500,000, preferably from 100,000 to 500,000.

The content ratio of the thermoplastic elastomer in the pressure-sensitive adhesive composition may be set to preferably from 3 wt % to 97 wt %, more preferably from 10 wt % to 90 wt % with respect to the weight of the second pressure-sensitive adhesive layer to be formed.

As the plasticizer, there is preferably used a high-molecular-weight compound having high affinity for a rubber phase and low affinity for a polystyrene phase with respect to a thermoplastic elastomer having the polystyrene phase and the rubber phase. As a specific example of the plasticizer, there is given, for example, a naphthene oil or liquid paraffin. The plasticizers may be used alone or in combination thereof.

The flash point of the naphthene oil is, for example, from 100° C. to 300° C., preferably from 150° C. to 280° C. In addition, the pour point thereof is, for example, from −30° C. to −5° C., preferably from −25° C. to −10° C. In addition, the specific gravity thereof is, for example, from 0.83 to 0.87, preferably from 0.837 to 0.868. Further, the carbon number thereof is, for example, from 3 to 8, preferably 5 or 6.

The flash point of the liquid paraffin is, for example, from 100° C. to 300° C., preferably from 150° C. to 280° C. In addition, the pour point thereof is, for example, from −30° C. to −5° C., preferably from −25° C. to −10° C. In addition, the specific gravity thereof is, for example, from 0.89 to 0.91, preferably from 0.8917 to 0.9065. Further, the carbon number thereof is, for example, from 20 to 35, preferably from 21 to 33.

The content ratio of the plasticizer in the pressure-sensitive adhesive composition may be set to preferably from 3 wt % to 97 wt %, more preferably from 10 wt % to 90 wt % with respect to the weight of the second pressure-sensitive adhesive layer to be formed.

A weight ratio between the thermoplastic elastomer and the plasticizer (weight ratio "thermoplastic elastomer:plasticizer") in the pressure-sensitive adhesive composition (as a result, the second pressure-sensitive adhesive layer) is not limited as long as the effects of the present invention are obtained, but is preferably from 5:95 to 95:5, more preferably from 10:90 to 90:10. With such content ratio, a sufficient pressure-sensitive adhesive strength can be exhibited to both of an adherend surface (barrier) and the supporting substrate.

The pressure-sensitive adhesive composition may contain any appropriate other component to the extent that the effects of the present invention are not impaired. An example of such other component is a deterioration-preventing agent. The deterioration-preventing agent and its blending ratio are as exemplified for the acrylic pressure-sensitive adhesive composition in the first embodiment.

A-6. Release Film

Examples of the release film 50 include paper, a plastic film, a polytetrafluoroethylene (PTFE) film, and a resin film having a surface subjected to silicone treatment or fluorinated silicone treatment.

A-7. Protective Substrate

Any appropriate substrate capable of protecting the exposed surface of the polarizing film laminate may be used as the protective substrate 60 in accordance with purposes. Specific examples thereof include resin substrates, such as a polyvinyl chloride film and a (meth)acrylic resin film of PMMA or the like.

The thickness of the protective substrate may be, for example, from 0.1 μm to 2 mm, preferably from 0.1 μm to 1.5 mm.

B. Barrier

According to another aspect of the present invention, there is provided a transparent barrier configured to divide a space having placed therein an image display apparatus configured to emit linearly polarized light from a display screen, the barrier having bonded thereto the polarizing film laminate described in the foregoing section A via the second pressure-sensitive adhesive layer so that an absorption axis of the polarizer is substantially parallel to a vibration direction of the linearly polarized light to be emitted by the image display apparatus.

Figure 3:
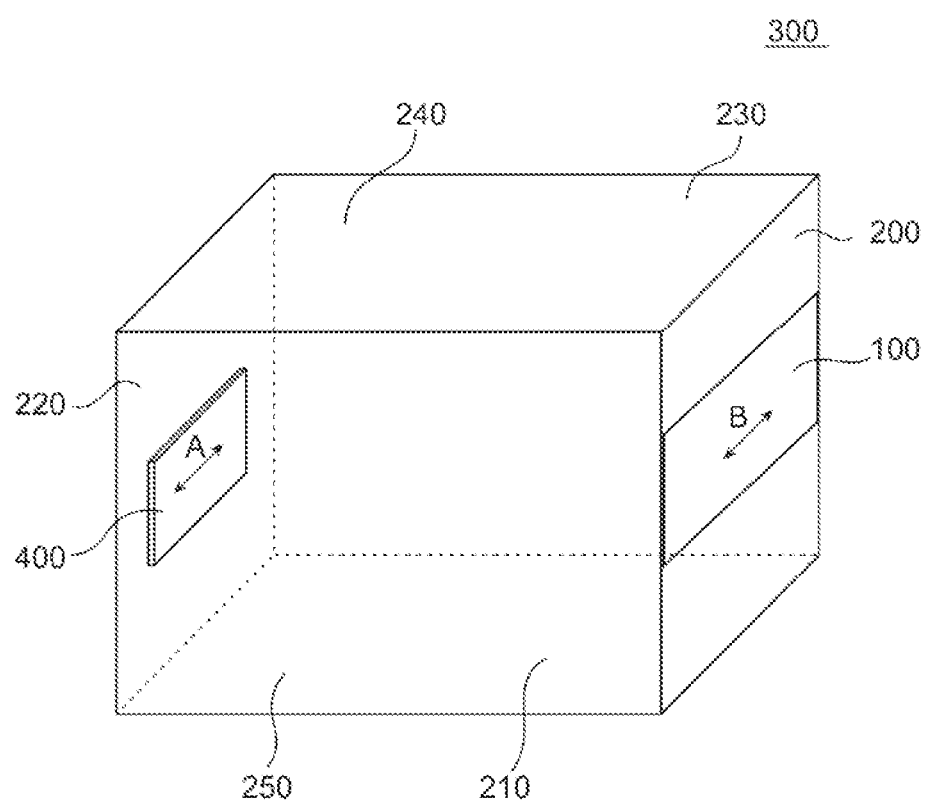
FIG. 3 is a schematic view for illustrating an example of a barrier having applied thereto the polarizing film laminate according to the embodiment of the present invention.

FIG. 3 is a schematic view for illustrating an example of a barrier having applied thereto the polarizing film laminate described in the foregoing section A. A space (room) 300 is divided by a pair of walls 200 and 220 opposed to each other, another pair of walls 210 and 230 opposed to each other in a direction intersecting the walls 200 and 220, a ceiling 240, and a floor 250, and has placed therein an image display apparatus 400. The wall 200 is a whole-surface window with its whole surface being formed of a transparent member (e.g., having a total light transmittance of 70% or more), and has a polarizing film laminate 100 bonded thereto so as to cover a part thereof corresponding to the image display apparatus 400 when an observer observes the inside of the space 300 from the outside of the wall 200. In addition, in this case, the polarizing film laminate 100 is arranged so that the vibration direction of linearly polarized light to be emitted by the image display apparatus 400 (arrow A direction) and the absorption axis direction of the polarizing film laminate 100 (arrow B direction) are substantially parallel to each other, and specifically, have an angle of 0°±10°, preferably an angle of 0°±5°, more preferably an angle of 0°±3°.

According to such configuration as described above, the linearly polarized light emitted by the image display apparatus 400 is absorbed by the polarizing film laminate 100, and hence the content displayed by the image display apparatus 400 can be prevented from being observed from the outside of the wall 200.

Unlike the illustrated example, part of the wall 200 may be a transparent barrier (window). In addition, the transparent barrier to which the polarizing film laminate is bonded is not limited to a window (including a whole-surface window), and may be, for example, a door or a partition. The polarizing film laminate may be bonded to the whole surface of the transparent barrier, or may be bonded to part thereof (only a required portion).

EXAMPLES

The present invention is specifically described below by way of Examples, but the present invention is not limited to these Examples. In addition, "part(s)" and "%" in Examples are by weight unless otherwise specified.

(1) Thickness

Measurement was performed by using a digital gauge (manufactured by Ozaki MFG. Co., Ltd., product name: "PEACOCK").

(2) Pressure-Sensitive Adhesive Strength to Glass

A pressure-sensitive adhesive strength to glass was measured by using a pressure-sensitive adhesion/coating peeling analyzer (manufactured by Kyowa Interface Science Co., Ltd., product name: "VPA-H200") in conformity with JIS 20237 under the following conditions.

Adherend: manufactured by Matsunami Glass Ind., Ltd., MICRO SLIDE GLASS S200423, ground edges, t1.3 (size: 65 mm×165 mm, thickness: 1.2 mm to 1.5 mm)

Test piece: polarizing film laminate obtained in an Example or Comparative Example cut into a size of 25 mm×150 mm Bonding method: 2 passes back and forth with a weight of 2 kg Measurement: 1 day of standing still after bonding before measurement Peel angle: 90°

Peel rate: 300 mm/min (3) Single Layer Transmittance and Polarization Degree of Polarizer A single layer transmittance Ts, a parallel transmittance Tp, and a cross transmittance Tc measured for a polarizing plate using a UV-Vis/NIR spectrophotometer (V-7100 manufactured by JASCO Corporation) were adopted as the Ts, Tp, and Tc of its polarizer, respectively. The Ts, the Tp, and the Tc are Y values measured with the two-degree field of view (C light source) of JIS 28701 and subjected to visibility correction. A polarization degree was determined from the resultant Tp and Tc through use of the following equation.

Polarization degree (%)=$\{(Tp-Tc)/(Tp+Tc)\}^{1/2} \times 100$

Production Example 1: Preparation of Acrylic Pressure-Sensitive Adhesive Layer A (Preparation of Acrylic Polymer Solution)

A monomer mixture containing 81.8 parts of butyl acrylate, 16 parts of phenoxyethyl acrylate, 1.5 parts of N-vinyl-2-pyrrolidone, 0.3 part of acrylic acid, and 0.4 part of 4-hydroxybutyl acrylate was loaded into a four-necked flask with a stirring blade, a temperature gauge, a nitrogen gas-introducing tube, and a condenser. Further, with respect to 100 parts of the monomer mixture (solid content), 0.1 part of 2,2'-azobisisobutyronitrile was loaded as a polymerization initiator together with 100 parts of ethyl acetate. While the mixture was gently stirred, a nitrogen gas was introduced to perform nitrogen purging. After that, while the liquid temperature in the flask was kept around 55° C., a polymerization reaction was performed for 8 hours to prepare a solution of an acrylic polymer A having a weight-average molecular weight (Mw) of 1,570,000 in which Mw/Mn=3.3.

(Preparation of Acrylic Pressure-Sensitive Adhesive Composition)

With respect to 100 parts of the solid content of the solution of the acrylic polymer A, 0.1 part of an isocyanate cross-linking agent (TAKENATE D160N manufactured by Mitsui Chemicals, Inc., trimethylolpropane-hexamethylene diisocyanate), 0.3 part of a peroxide-based cross-linking agent (benzoyl peroxide (product name: NYPER BMT, manufactured by Nippon Oil & Fats Co., Ltd.)), and 0.2 part of a silane coupling agent (product name: KBM403, manufactured by Shin-Etsu Chemical Co., Ltd.) were blended to prepare an acrylic pressure-sensitive adhesive composition A.

The acrylic pressure-sensitive adhesive composition A obtained in the foregoing was applied to one surface of a polyethylene terephthalate film treated with a silicone-based releasing agent (release film: manufactured by Mitsubishi Polyester Film Corporation, MRF38) so that a pressure-sensitive adhesive layer after drying had a thickness of 12 μm, and the applied composition was dried at 155° C. for 1 minute to form an acrylic pressure-sensitive adhesive layer A on the surface of the release film.

Production Example 2: Preparation of Acrylic Pressure-Sensitive Adhesive Layer B (Preparation of Acrylic Polymer Solution)

A monomer mixture containing 94.9 parts by weight of butyl acrylate, 5 parts by weight of acrylic acid, and 0.1 part by weight of 2-hydroxyethyl acrylate was loaded into a four-necked flask with a stirring blade, a temperature gauge, a nitrogen gas-introducing tube, and a condenser. With respect to 100 parts by weight of the solid content of the monomer mixture, 0.1 part by weight of 2,2'-azobisisobutyronitrile was added as a polymerization initiator together with ethyl acetate. While the resulting mixture was gently stirred, a nitrogen gas was introduced to perform nitrogen purging. Then, while the liquid temperature in the flask was kept around 55° C., a polymerization reaction was performed for 7 hours. Ethyl acetate was added to the resultant reaction liquid to adjust the concentration of a polymer component to 30 wt % to prepare a solution of an acrylic polymer B having a weight-average molecular weight of 2,000,000.

(Preparation of Acrylic Pressure-Sensitive Adhesive Composition)

0.6 Part by weight of an isocyanate-based cross-linking agent (product name: CORONATE L, trimethylolpropane-tolylene diisocyanate, manufactured by Nippon Polyurethane Industry Co., Ltd.), 0.2 part by weight of a peroxide-based cross-linking agent (benzoyl peroxide (product name: NYPER BMT, manufactured by Nippon Oil & Fats Co., Ltd.)), and 0.2 part by weight of a silane coupling agent (product name: KBM403, manufactured by Shin-Etsu Chemical Co., Ltd.) were mixed with respect to 100 parts by weight of the polymer component of the solution of the acrylic polymer B to prepare an acrylic pressure-sensitive adhesive composition B.

The acrylic pressure-sensitive adhesive composition B obtained in the foregoing was uniformly applied with a fountain coater to the surface of a release film (polyethylene terephthalate film treated with a silicone-based releasing agent). After that, the resultant was dried in an air-circulating thermostatic oven at 155° C. for 70 seconds to form a pressure-sensitive adhesive layer B having a thickness of 15 µm on the surface of the release film.

Example 1

(Production of Polarizing Plate)

An amorphous isophthalic acid-copolymerized polyethylene terephthalate film having an elongate shape and having a Tg of about 75° C. (thickness: 100 µm) was used as a thermoplastic resin substrate, and one surface of the resin substrate was subjected to corona treatment.

13 Parts by weight of potassium iodide was added to 100 parts by weight of a PVA-based resin obtained by mixing polyvinyl alcohol (polymerization degree: 4,200, saponification degree: 99.2 mol %) and acetoacetyl-modified PVA (manufactured by The Nippon Synthetic Chemical Industry Co., Ltd., product name: "GOHSEFIMER") at 9:1, and the resultant was dissolved in water to prepare an aqueous solution of PVA (application liquid).

The aqueous solution of PVA was applied to the corona-treated surface of the resin substrate and dried at 60° C. to form a PVA-based resin layer having a thickness of 13 µm, to thereby produce a laminate.

The resultant laminate was uniaxially stretched in its longitudinal direction (lengthwise direction) at 2.4 times in an oven at 130° C. (in-air auxiliary stretching treatment).

Then, the laminate was immersed in an insolubilizing bath having a liquid temperature of 40° C. (aqueous solution of boric acid obtained by blending 100 parts by weight of water with 4 parts by weight of boric acid) for 30 seconds (insolubilizing treatment).

Then, the laminate was immersed in a dyeing bath having a liquid temperature of 30° C. (aqueous solution of iodine obtained by blending 100 parts by weight of water with iodine and potassium iodide at a weight ratio of 1:7) for 60 seconds while a concentration was adjusted so that the single layer transmittance (Ts) of a polarizer to be finally obtained took a desired value (dyeing treatment).

Then, the laminate was immersed in a cross-linking bath having a liquid temperature of 40° C. (aqueous solution of boric acid obtained by blending 100 parts by weight of water with 3 parts by weight of potassium iodide and with 5 parts by weight of boric acid) for 30 seconds (cross-linking treatment).

After that, the laminate was uniaxially stretched in its longitudinal direction (lengthwise direction) between rolls having different peripheral speeds so as to achieve a total stretching ratio of 5.5 times while being immersed in an aqueous solution of boric acid having a liquid temperature of 70° C. (boric acid concentration: 4 wt %, potassium iodide concentration: 5 wt %) (underwater stretching treatment).

After that, the laminate was immersed in a washing bath having a liquid temperature of 20° C. (aqueous solution obtained by blending 100 parts by weight of water with 4 parts by weight of potassium iodide) (washing treatment).

After that, the laminate was brought into contact with a heated roll made of SUS kept at a surface temperature of about 75° C. while being dried in an oven kept at about 90° C. (drying shrinkage treatment).

Thus, a polarizer having a thickness of about 5 µm was formed on the resin substrate to provide a laminate having a configuration "resin substrate/polarizer".

A triacetylcellulose (TAC) film with a hard coat layer (hard coat layer thickness: 7 µm, TAC thickness: 25 µm) was bonded as a protective layer to a surface of the polarizer obtained in the foregoing (surface thereof on the opposite side to the resin substrate) via a UV-curable adhesive. Then, the resin substrate was peeled off to provide a polarizing plate having a configuration "[polarizer/protective layer]". The resultant polarizer had a single layer transmittance of 43% and a polarization degree of 99.9%.

(Production of Polarizing Film Laminate)

The pressure-sensitive adhesive layer A was transferred from the release film to the polarizer-side surface of the polarizing plate obtained in the foregoing. To the resultant polarizing plate with a pressure-sensitive adhesive layer, a PET film with a pressure-sensitive adhesive layer containing an SEBS-based elastomer (manufactured by Panac Co., Ltd., product name: "Gelpolyclear 50UV-IJII", pressure-sensitive adhesive layer thickness: 35 µm, PET film thickness: 50 µm) was bonded via the pressure-sensitive adhesive layer A so that the PET film was opposed to the pressure-sensitive adhesive layer A. Thus, a polarizing film laminate having a configuration "[protective layer/polarizer/pressure-sensitive adhesive layer A/PET film/pressure-sensitive adhesive layer containing SEBS-based elastomer]" was obtained.

Example 2

A polarizing film laminate having a configuration "[protective layer/polarizer/pressure-sensitive adhesive layer A/PET film/acrylic pressure-sensitive adhesive layer]" was obtained in the same manner as in Example 1 except that a PET film with an acrylic pressure-sensitive adhesive layer (manufactured by Nitto Denko Corporation, product name: "E-MASK RP207", pressure-sensitive adhesive layer thickness: 21 µm, PET film thickness: 38 µm) was used in place of the PET film with a pressure-sensitive adhesive layer containing an SEBS-based elastomer (manufactured by Panac Co., Ltd., product name: "Gelpolyclear 50UV-IJII").

Example 3

A polarizing film laminate having a configuration "[protective layer/polarizer/pressure-sensitive adhesive layer A/polyethylene film/acrylic pressure-sensitive adhesive layer]" was obtained in the same manner as in Example 1 except that a polyethylene film with an acrylic pressure-sensitive adhesive layer (manufactured by Nitto Denko Corporation, product name: "E-MASK R300", pressure-sensitive adhesive layer thickness: 20 µm, polyethylene film thickness: 50 µm) was used in place of the PET film with a pressure-sensitive adhesive layer containing an SEBS-based elastomer (manufactured by Panac Co., Ltd., product name: "Gelpolyclear 50UV-IJII").

Comparative Example 1

The pressure-sensitive adhesive layer A was transferred from the release film to the polarizer-side surface of a polarizing plate obtained in the same manner as in Example 1 to provide a polarizing film laminate having a configuration "[protective layer/polarizer/pressure-sensitive adhesive layer A]."

Comparative Example 2

The pressure-sensitive adhesive layer A was transferred from the release film to the polarizer-side surface of a polarizing plate obtained in the same manner as in Example 1, and a PET film (thickness: 50 µm) was bonded thereto via the pressure-sensitive adhesive layer A. Then, the pressure-sensitive adhesive layer B was transferred from the release film to the PET film surface to provide a polarizing film laminate having a configuration "[protective layer/polarizer/pressure-sensitive adhesive layer A/PET film/pressure-sensitive adhesive layer B]."

<<Peelability Evaluation 1>>

The polarizing film laminate obtained in each of Examples and Comparative Examples was bonded to a glass plate via the pressure-sensitive adhesive layer arranged on the surface thereof on the opposite side to the protective layer. Then, a state at a time when an end portion of the polarizing film laminate was rolled up with fingers in order to peel off polarizing film laminate was evaluated on the basis of the following criteria. The results are shown in Table 1.

○: The polarizing film laminate can be easily peeled off.
Δ: The polarizing film laminate can be peeled off, but the polarizing plate is torn (broken).
x: The polarizing film laminate cannot be peeled off because the polarizing plate is chipped (interlayer peeling).

<<Peelability Evaluation 2>>

The polarizing film laminate obtained in each of Examples and Comparative Examples was bonded to a glass partition (1,000 mm×1,000 mm) via the pressure-sensitive adhesive layer arranged on the surface thereof on the opposite side to the protective layer. Then, a state at a time when an end portion of the polarizing film laminate was rolled up with fingers in order to peel off polarizing film laminate was evaluated on the basis of the following criteria. The results are shown in Table 1.

○: The polarizing film laminate can be easily peeled off.
Δ: The polarizing film laminate can be peeled off, but the polarizing plate is broken.
x: The polarizing film laminate cannot be peeled off.

TABLE 1

|  | Example 1 | Example 2 | Example 3 | Comparative Example 1 | Comparative Example 2 |
|---|---|---|---|---|---|
| Pressure-sensitive adhesive strength to glass [N/25 mm] | 0.05 | 0.17 | 0.7 | 2.5 | 6.7 |
| Peelability evaluation 1 | ○ | ○ | ○ | Δ | x |
| Peelability evaluation 2 | ○ | ○ | ○ | Δ | x |

Preferred embodiments of the present invention have been described in detail above. However, the present invention is not limited to the above-mentioned embodiments, and various modifications and substitutions may be applied to the above-mentioned embodiments without departing from the scope of the present invention.

INDUSTRIAL APPLICABILITY

The polarizing film laminate of the present invention is suitably used as, for example, an indoor privacy protection film.

REFERENCE SIGNS LIST 10 polarizing plate
12 polarizer
14 inner protective layer
16 outer protective layer
20 first pressure-sensitive adhesive layer
30 supporting substrate
32 substrate main body
34 functional layer
40 second pressure-sensitive adhesive layer
50 release film
100 polarizing film laminate
200 wall
210 wall
220 wall
230 wall
240 ceiling
250 floor
300 space
400 image display apparatus

The invention claimed is:

1. A polarizing film laminate, comprising:
a polarizing plate including a polarizer;
a first pressure-sensitive adhesive layer;
a supporting substrate; and
a second pressure-sensitive adhesive layer having a smaller pressure sensitive adhesive strength to glass than the first pressure-sensitive adhesive layer,
which are laminated in the stated order,
wherein a pressure-sensitive adhesive strength to glass of the second pressure-sensitive adhesive layer is from 0.01 N/25 mm to 0.5 N/25 mm at a peel angle of 90° and a peel rate of 300 mm/min.

2. The polarizing film laminate according to claim 1, wherein the polarizing plate further includes a protective layer arranged on at least one side of the polarizer.

3. The polarizing film laminate according to claim 1, wherein the supporting substrate includes a substrate main body and a functional layer arranged on at least one side thereof.

4. The polarizing film laminate according to claim 3, wherein the functional layer is at least one kind of layer selected from an antistatic layer and an antifouling layer.

5. The polarizing film laminate according to claim 1, wherein a thickness from the polarizing plate to the second pressure-sensitive adhesive layer is from 50 µm to 500 µm.

6. The polarizing film laminate according to claim 1, further comprising a release film laminated on an opposite side of the second pressure-sensitive adhesive layer to a side on which the supporting substrate is arranged.

7. The polarizing film laminate according to claim 1, wherein the pressure-sensitive adhesive strength to glass of the second pressure-sensitive adhesive layer is from 0.1% to 40% a pressure-sensitive adhesive strength to glass of the first pressure-sensitive adhesive layer.

8. A transparent barrier configured to divide a space having placed therein an image display apparatus configured to emit linearly polarized light from a display screen, the barrier having bonded thereto the polarizing film laminate of claim 1 via the second pressure-sensitive adhesive layer so that an absorption axis of the polarizer is substantially parallel to a vibration direction of the linearly polarized light to be emitted by the image display apparatus.

9. The barrier according to claim 8, wherein the barrier is a window, a wall, a door, or a partition.

* * * * *